(12) United States Patent
Gholmieh et al.

(10) Patent No.: US 9,125,139 B2
(45) Date of Patent: *Sep. 1, 2015

(54) MOBILE ACCESS IN A DIVERSE ACCESS POINT NETWORK

(71) Applicant: QUALCOMM Incorporated

(72) Inventors: Aziz Gholmieh, San Diego, CA (US); Francesco Grilli, La Jolla, CA (US); Nathan Edward Tenny, Poway, CA (US); Samer S. Zreiq, Haifa (IL); Shlomo Nizri, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,646

(22) Filed: Nov. 18, 2013

(65) Prior Publication Data

US 2014/0073286 A1  Mar. 13, 2014

Related U.S. Application Data

(63) Continuation of application No. 12/239,502, filed on Sep. 26, 2008, now Pat. No. 8,588,738.

(51) Int. Cl.
*H04W 48/14* (2009.01)
*H04W 48/02* (2009.01)
(Continued)

(52) U.S. Cl.
CPC .............. *H04W 48/14* (2013.01); *H04W 48/02* (2013.01); *H04W 16/32* (2013.01); *H04W 48/08* (2013.01)

(58) Field of Classification Search
CPC ..... H04W 16/32; H04W 48/02; H04W 48/08; H04W 48/14

USPC .......................... 455/435.1–435.3, 410, 550.1
See application file for complete search history.

(56) References Cited

U.S. PATENT DOCUMENTS 5,668,880 A  9/1997  Alajajian
6,334,052 B1  12/2001  Nordstrand
(Continued)

FOREIGN PATENT DOCUMENTS

CN  1578487 A  2/2005
CN  1939080 A  3/2007
(Continued)

OTHER PUBLICATIONS

European Search Report—EP10170309—Search Authority—The Hague—Aug. 4, 2010.
(Continued)

*Primary Examiner* — Kashif Siddiqui
(74) *Attorney, Agent, or Firm* — Fariba Yadegar-Bandari

(57) ABSTRACT

Facilitating user terminal (UT) access to wireless networks having base stations (BSs) of disparate access types is described herein. In some aspects, BS parameterization is provided to facilitate search and/or access to distinct types of network BSs. For instance, parameters can modify a likelihood of identifying or remaining coupled to restricted access (RA) BSs in a home Node B (HNB) deployment. In other aspects of the subject disclosure, a PLMN ID reserved for HNBs is provided comprising multiple region IDs. Where a UT identifies a home region, HNBs can be given preference over macro BSs. Additionally, the UT can keep track of HNBs and HNB regions that reject access to the UT, and implement a delay time to mitigate rapid signaling to foreign HNBs in a dense HNB deployment. Accordingly, the subject disclosure provides for more efficient UT access in heterogeneous access type networks.

70 Claims, 13 Drawing Sheets

(51) Int. Cl.
 *H04W 16/32* (2009.01)
 *H04W 48/08* (2009.01)

(56) References Cited

U.S. PATENT DOCUMENTS

| | | | |
|---|---|---|---|
| 6,374,009 | B1 | 4/2002 | Chang et al. |
| 6,643,511 | B1 | 11/2003 | Rune et al. |
| 6,751,472 | B1 | 6/2004 | Muhonen |
| 6,801,772 | B1 * | 10/2004 | Townend et al. ............. 455/436 |
| 8,085,715 | B2 | 12/2011 | Law et al. |
| 8,588,773 | B2 | 11/2013 | Deshpande et al. |
| 8,737,295 | B2 | 5/2014 | Horn et al. |
| 8,848,656 | B2 | 9/2014 | Horn et al. |
| 8,902,867 | B2 | 12/2014 | Horn et al. |
| 2004/0192221 | A1 | 9/2004 | Matsunaga |
| 2004/0203745 | A1 | 10/2004 | Cooper |
| 2005/0185666 | A1 | 8/2005 | Raya et al. |
| 2005/0245260 | A1 * | 11/2005 | Nielsen et al. ............. 455/435.1 |
| 2007/0026856 | A1 | 2/2007 | Krantz et al. |
| 2007/0054668 | A1 | 3/2007 | Scheinert et al. |
| 2008/0101301 | A1 | 5/2008 | Thomas et al. |
| 2008/0220782 | A1 | 9/2008 | Wang et al. |
| 2009/0061821 | A1 | 3/2009 | Chen et al. |
| 2009/0086672 | A1 | 4/2009 | Gholmieh et al. |
| 2009/0088131 | A1 | 4/2009 | Gholmieh et al. |
| 2009/0104905 | A1 | 4/2009 | DiGirolamo et al. |
| 2009/0135784 | A1 | 5/2009 | Horn et al. |
| 2009/0137228 | A1 | 5/2009 | Horn et al. |
| 2010/0027510 | A1 | 2/2010 | Balasubramanian et al. |
| 2014/0045495 | A1 | 2/2014 | Deshpande et al. |
| 2015/0029930 | A1 | 1/2015 | Horn et al. |

FOREIGN PATENT DOCUMENTS

| | | |
|---|---|---|
| CN | 101009920 A | 8/2007 |
| EP | 1835780 | 9/2007 |
| GB | 2315193 | 1/1998 |
| JP | H08501430 A | 2/1996 |
| JP | 11004471 A | 1/1999 |
| JP | 2000514267 A | 10/2000 |
| JP | 2002305762 A | 10/2002 |
| JP | 2004104804 A | 4/2004 |
| JP | 2004236340 A | 8/2004 |
| JP | 2004304399 A | 10/2004 |
| JP | 2006115426 A | 4/2006 |
| JP | 2007006320 A | 1/2007 |
| JP | 2007088605 A | 4/2007 |
| JP | 2007221786 A | 8/2007 |
| JP | 2008544596 A | 12/2008 |
| KR | 20060123427 A | 12/2006 |
| RU | 2004126674 A | 1/2006 |
| WO | WO-2005076547 A1 | 8/2005 |
| WO | WO-2005094111 A1 | 10/2005 |
| WO | WO-2005101886 A2 | 10/2005 |
| WO | WO-2006094458 A1 | 9/2006 |
| WO | WO-2006133720 A1 | 12/2006 |

OTHER PUBLICATIONS

Huawei,"National Roaming PLMN selection for home Node B",R2-073160, 3GPP TSG-RAN-WG2 Meeting #59, Aug. 24, 2007.
International Search Report—PCT/US08/078183, International Search Authority—Euopean Patent Office—Mar. 12, 2009.
International Search Report and Written Opinion—PCT/US08/078189, International Search Authority—European Patent Office—Mar. 31, 2009.
Nokia, Nokia Siemens Networks, "E-UTRA Cell Selection and Cell Reselection Aspects",R2-073069, 3GPP TSG-RAN WG2 Meeting #59,Aug. 24, 2007.
Nokia, Nokia Siemens Networks, Vodafone, "E-UTRA Cell Selection and Cell Reselection Aspects",R2-073622,3GPP TSG-RAN WG2 Meeting #59, Aug. 24, 2007.
Nokia, Nokia Siemens Networks, Vodafone, "E-UTRA Cell Selection and Cell Reselection Aspects",R4-071396,3GPP TSG-RAN WG4 Meeting #44 ,Aug. 24, 2007.
NTT DoCoMo, "Idle mode mobility control principles", R4-071365, 3GPP TSG RAN WG4 #44, Aug. 24, 2007.
NTT DoCoMo, Inc., "Idle mode mobility control principles",R2-073375, 3GPP TSG RAN WG2 #59,Aug. 24, 2007.
Written Opinon—PCT/US08/078183, International Search Authority—Euopean Patent Office—Mar. 12, 2009.
Ericsson: "Idle state access restriction for home eNB", R2-073415, 3GPP TSG-RAN WG2#59, Aug. 24, 2007.
Huawei: "Need for PCI CSG to be known in the UE", 3GPP TSG-RAN WG2#63bis R2-085663, Oct. 3, 2008.
Taiwan Search Report—TW098100744—TIPO—Nov. 22, 2013.
ETSI TS 125 304 V7.7.0 (2008-10), Universal Mobile Telecommunications System (UMTS); User Equipment (UE) procedures in idle mode and procedures for cell reselection in connected mode (3GPP Ts 25.304 version 7.7.0 Release 7), 2008, 44 pages.

* cited by examiner

MOBILE ACCESS IN A DIVERSE ACCESS POINT NETWORK

CLAIM OF PRIORITY

The present application for patent is a continuation of U.S. Pat. No. 8,588,738, entitled "MOBILE ACCESS IN A DIVERSE ACCESS POINT NETWORK," filed Sep. 26, 2008, which will issue on Nov. 19, 2013, assigned to the assignee hereof, and expressly incorporated herein by reference in its entirety, and which claims priority to U.S. Provisional Application No. 60/976,738 entitled METHODS, APPARATUS, AND SYSTEM FOR SUPPORTING ACCESS POINT BASE STATIONS WITHIN A WIRELESS WAN SYSTEM filed Oct. 1, 2007, assigned to the assignee hereof and hereby expressly incorporated by reference herein.

REFERENCE TO CO-PENDING APPLICATIONS FOR PATENT

The present application for patent is related to the following co-pending U.S. patent application Ser. No. 12/239,509, entitled "EQUIVALENT HOME ID FOR MOBILE COMMUNICATIONS" by Samer Zreiq et al., filed concurrently herewith, assigned to the assignee hereof and expressly incorporated by reference herein.

BACKGROUND

I. Field

The following disclosure relates generally to wireless communication, and more specifically to managing remote access for devices in a restricted access point environment.

II. Background

Wireless communication systems are widely deployed to provide various types of communication (e.g., voice, data, multimedia services, etc.) to multiple users. Subscription based services allow users to access and utilize various communication content over a service provider's network. As the demand for high-rate and multimedia data services rapidly grows, there lies a challenge to implement efficient and robust communication systems with enhanced performance.

Traditional fixed line communication systems, such as digital subscriber line (DSL), cable line, dial-up, or like connections offered by Internet service providers (ISPs), are alternative and sometimes competing communication platforms to wireless communications. However, in recent years users have begun replacing fixed line communications with mobile communications. Several advantages of mobile communication systems, such as user mobility, small relative size of user equipment (UE), and ready access to public switched telephone networks as well as the Internet, have made such systems very convenient and thus very popular. As users have begun relying more on mobile systems for communication services traditionally obtained through fixed line systems, demand for increased bandwidth, reliable service, high voice quality and low prices has heightened.

In addition to mobile phone networks currently in place, a new class of small base stations has emerged. These small base stations are low power and can typically utilize fixed line communications to connect with a mobile operator's core network. In addition, these base stations can be distributed for personal/private use in a home, office, apartment, private recreational facility, and so on, to provide indoor/outdoor wireless coverage to mobile units. These personal base stations are generally known as access point base stations, or, alternatively, as home Node B units (HNBs) or Femto cells. Femto cell base stations offer a new paradigm in mobile network connectivity, allowing direct subscriber control of mobile network access and access quality.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for facilitating user terminal (UT) access to wireless networks having base stations (BSs) of disparate access types. In some aspects, BS parameterization is provided to facilitate transition between distinct types of network BSs. For instance, parameters can be configured to increase or decrease a probability that a UT searches for or hands off to a particular type of BS, such as a restricted access (RA) home Node B (HNB), or a general access (GA) macro BS. In other aspects of the subject disclosure, a public land mobile network (PLMN) identifier (ID) is provided for RA BSs, to distinguish such BSs from GA macro BSs. Accordingly, UTs can identify whether a received wireless signal is originated at an RA BS, based on the PLMN ID. According to further aspects, RA regional IDs are established for the RA PLMN and UTs can be associated with a particular home region. If the UT roams into a home region, it can search for and attempt to access RA BSs. When the UT is not in the home region, it can ignore RA BSs, reducing signaling overhead in non-home regions. When in the home region, the UT can keep track of failed and successful access attempts, reducing a likelihood of subsequent access failures and facilitating identification of subsequent RA BSs that permit access to the UT.

According to further aspects, disclosed is a method of providing mobile access in a wireless network. The method can comprise obtaining a wireless signal comprising a network access request and allowing or denying the network access request. Additionally, the method can comprise transmitting a set of UT parameters that increases a probability that a UT will obtain and access an RA BS or decreases a probability that the UT will access a GA BS in favor of the RA BS.

According to other aspects, provided is a BS. The BS can comprise a transceiver that obtains a wireless signal comprising a network access request and a registration module that allows or denies the network access request. Furthermore, the BS can comprise a selective access module that employs the transceiver to transmit a set of UT parameters to increase a probability that a UT will obtain and access an RA BS or to decrease a probability that the UT will access a GA BS.

According to one or more additional aspects, disclosed is an apparatus that provides mobile access in a wireless network. The apparatus can comprise means for obtaining a wireless signal comprising a network access request and means for allowing or denying the network access request. Moreover, the apparatus can comprise means for transmitting a set of UT parameters that increases a probability that a UT will obtain and access an RA BS or decreases a probability that the UT will access a GA BS.

According to yet other aspects, disclosed is a processor configured to provide mobile access in a wireless network. The processor can comprise a first module that obtains a wireless signal comprising a network access request and a second module that allows or denies the network access request. In addition, the processor can comprise a third module that transmits a set of UT parameters that increases a probability that a UT will obtain and access an RA BS or decreases a probability that the UT will access a GA BS.

In one or more other aspects, provided is a computer program product comprising a computer-readable medium. The computer readable medium can comprise a first set of codes for causing a computer to obtain a wireless signal comprising a network access request and a second set of codes for causing the computer to allow or deny the network access request. Moreover, the computer-readable medium can comprise a third set of codes for causing the computer to transmit a set of UT parameters that increases a probability that a UT will obtain and access an RA BS or decreases a probability that the UT will access a GA BS.

According to further aspects of the subject disclosure, disclosed is a method of accessing a wireless network. The method can comprise receiving a wireless signal transmitted by a wireless network BS and obtaining a set of parameters configured to weight a probability of employing an RA or GA BS to interface with the wireless network. Furthermore, the method can comprise employing the set of parameters to implement communication with the network.

In other aspects, provided is a UT configured for accessing a wireless network. The UT can comprise a transceiver that obtains a wireless signal transmitted by a wireless network BS. In addition, the UT can comprise a signal processor that obtains a set of parameters configured to weight a probability of employing an RA or GA BS to interface with the wireless network. Furthermore, the UT can comprise an access module that employs the set of parameters to implement communication with the network.

According to further aspects, disclosed is an apparatus for accessing a wireless network. The apparatus can comprise means for receiving a wireless signal transmitted by a wireless network BS and means for obtaining a set of parameters configured to weight a probability of employing an RA or GA BS to interface with the wireless network. Moreover, the apparatus can comprise means for employing the set of parameters to implement communication with the network.

In addition to the foregoing, disclosed is a processor configured for accessing a wireless network. The processor can comprise a first module that receives a wireless signal transmitted by a wireless network BS and a second module that obtains a set of parameters configured to weight a probability of employing an RA or GA BS to interface with the wireless network. Further, the processor can comprise a third module that employs the set of parameters to implement communication with the network.

In at least one other aspect, provided is a computer program product comprising a computer-readable medium. The computer-readable medium can comprise a first set of codes for causing a computer to receive a wireless signal transmitted by a wireless network BS and a second set of codes for causing the computer to obtain a set of parameters configured to weight a probability of employing an RA or GA BS to interface with the wireless network. In addition to the foregoing, the computer-readable medium can comprise a third set of codes for causing the computer to employ the set of parameters to implement communication with the network.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
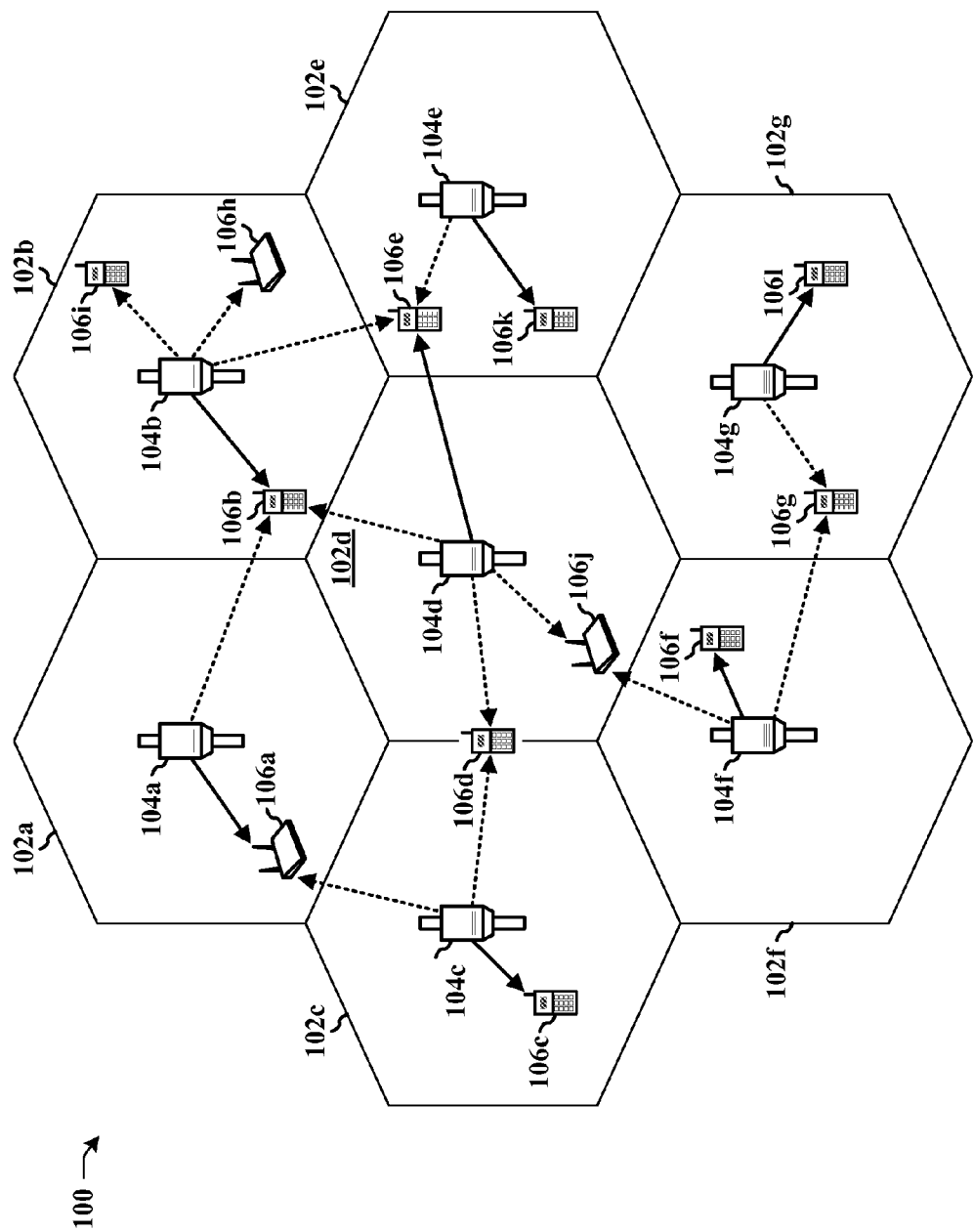
FIG. 1 depicts a block diagram of an example wireless communication environment according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of implementing improved base station (BS) access in a heterogeneous wireless access point environment. One skilled in the art should appreciate that similar techniques could apply to other communication environments.

Introduction of home Node B (HNB) base stations (BSs) into wireless access networks enables significant flexibility and consumer control over personal access to such networks. As wireless resources increase over time, and as processing and user interface capabilities of terminal devices become more sophisticated, users are able to employ mobile devices to perform functions formerly available only with personal computers and fixed line communications. The ability to employ a small, portable device for high quality voice communication, Internet access, multimedia access and playback, and entertainment, results in a highly desirable consumer product. However, because the macro wireless network is deployed for large-scale public usage, indoor reception can often be poorer than outdoor reception (e.g., due to absorption of radio frequency signals by buildings, insulation, ground landscaping, etc.). HNB technology provides a user with significant control over personal wireless connectivity, often obviating most or all indoor connectivity problems. Thus, HNBs can further extend UT mobility even in a sub-optimal environment for macro networks.

Despite the significant advantages of HNB deployment, some problems have resulted due to added complexity in coupling HNBs with an operator's macro networks. For instance, HNB deployment is typically un-planned or semi-planned, meaning that these BSs are installed outside of the control of the network operator. Thus, the operator has limited capacity to implement ideal placement of HNBs relative other such access points or relative macro BSs, to shape a wireless signals of HNBs relative other access point cells, or even to know the exact placement of the cells. In addition, where HNB deployment is open to consumer purchase and installation, a very dense installation of such cells can occur in high population urban areas, leading to wireless resource competition among nearby HNB and macro cells. Furthermore, HNBs are typically associated with a closed subscriber group (CSG) and provide network access only to members of the CSG; access is not provided to the general cellular public, for instance. Thus, HNB deployment amid a macro network integrates restricted access (RA) BSs with general access (GA) BSs.

Many legacy mobile terminals are not equipped to distinguish GA and RA BSs, and therefore can spend significant power searching for and attempting to access RA BSs that will end up denying service. Additionally, legacy terminals and legacy wireless networking standards require mobile terminals to scan incoming wireless signals to identify optimal signals. Where there are only a few nearby BSs that the terminal can distinguish, this is typically a workable process. However, in dense HNB deployments, dozens or hundreds of HNBs can exist in close proximity (e.g., within a large urban apartment building). If a UT's home HNB, an HNB in which the UT as included in a CSG, is within the dense HNB deployment, one problem results in identifying the home HNB and focusing on the pilot and control channels of that home HNB (camping on that HNB). Where the UT is not in a region that includes its home HNB, the problem becomes ignoring HNB signals and focusing on the macro network. The subject disclosure provides solutions for an integrated, or heterogeneous, deployment of RA and GA BSs.

To address the foregoing problems, aspects of the subject disclosure provide for mechanisms to direct UTs to search and access particular types of BSs over other types. Such mechanisms are designed to modify legacy defaults that cause UTs to search for, camp on and/or hand off to cells having a strongest signal or lowest path loss. Because RA BSs provide network access only to a CSG, strongest signal and/or lowest path loss, are not, in isolation, the best criteria for selecting network cells. Thus, the modified cell selection and search disclosed herein can incorporate preferences for BS-type into traditional defaults. In addition, the disclosed subject matter can be utilized for a single frequency or multi-frequency wireless network deployment.

According to some aspects, UT parameterization can be provided by a network to make a UT be more likely to search for and access RA BSs as opposed to GA BSs, or vice versa. In some such aspects, capabilities of the UT can be obtained at the network and the parameterization can be configured for the UT or a type of UT. For instance, if the UT is an RA-capable device (e.g., having an HNB subscription and belonging to a CSG of one or more HNBs), parameters weighted toward identifying, accessing, camping on and/or handing off to RA BSs can be provided to the UT. If, on the other hand, the UT is not RA-capable, the parameters weighted toward identifying, accessing etc., GA BSs instead.

In other aspects of the disclosure, multi-frequency parameterization is also provided to weight UT preference for or against a type of BS. For instance, where HNBs and macro cells utilize different frequencies, or have at least one macro or HNB-only frequency, the network can establish preferences for one or another type of frequency, depending on UT capabilities, for instance. Such preferences can make the UT more likely to search for or camp on one type of BS over another. Accordingly, an RA-capable UT can be directed toward HNB BSs and/or HNB frequencies to increase a likelihood of discovering an HNB associated with the UT. Non RA-capable UTs can be directed toward the macro network and/or macro frequencies to reduce or eliminate signaling to HNBs, reduce access rejection from un-associated HNBs, and properly load balance macro and HNB networks.

Other aspects of the subject disclosure provide for reducing signaling in a dense, un-planned/semi-planned deployment of HNBs. In such an environment, it is typical for a UT to be included in a CSG of only one or few HNBs (e.g., a home HNB), and be excluded by many more HNBs. Thus, where many HNBs exist in a relatively small area, the UT can expend a great deal of processing power and battery life signaling the various excluded HNBs until the home HNB is found. As a particular example to illustrate the foregoing, if a user is driving through a residential area containing many HNBs, the best signal received at the UT is constantly changing, causing the UT to rapidly search for new cells and rapidly attempt to handoff to new cells. The signaling overhead and drain on battery life in such a scenario can be tremendous.

To remedy the above problem, a Femto public land mobile network (PLMN) identifier (ID) can be defined for HNB BSs. Each HNB can broadcast the Femto PLMN ID with its pilot signals, along with data distinguishing the HNB from other HNBs. If a UT is not in a region where it expects to find an associated home HNB, the Femto PLMN ID, and all signals carrying this ID, can be ignored. Thus, where the above user is driving in neighborhoods other than his/her own, the UT can ignore HNB signals and/or frequency channels associated with the Femto PLMN ID. The UT will thus have a tendency to acquire macro network BSs over the RA BSs. If the UT is, however, in a region associated with the home HNB, BSs broadcasting the Femto PLMN ID and/or frequencies utilized by such BSs can be given preference, as described above, over macro network BSs/frequencies. Thus, the UT will have a tendency to acquire RA BSs over GA macro BSs.

According to other aspects, if the UT requests network access from a BS and that access is rejected (e.g., where the BS has a CSG that does not include the UT), the UT can revert to macro BS frequencies and/or ignore the Femto PLMN ID for a penalty time. This can help to reduce or eliminate successive rejections by non-home RA BSs, and the increased signaling overhead involved therein (e.g., when the user is driving through a dense deployment of HNBs). In addition to the foregoing, the UT can record a cell ID of an HNB (e.g., identified via the Femto PLMN ID) that rejects an access request, to avoid subsequent signaling to that BS. Likewise, the BS can record a cell ID of an HNB that provides access to the UT, and give preference to that cell ID. By employing these and like techniques, UTs can take advantage of HNB technology while mitigating adverse effects involved in dense, un-planned deployments of heterogeneous access type BSs.

The techniques described herein can be used for various wireless communication systems such as code division multiple access (CDMA), time division multiple access (TDMA), frequency division multiple access (FDMA), orthogonal FDMA (OFDMA), SC-FDMA (single carrier FDMA) and other systems. The terms "system" and "network" are often used interchangeably. A CDMA system can implement a radio technology such as Universal Terrestrial Radio Access (UTRA), CMDA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). LTE (long term evolution) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE), or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media comprises computer-readable hardware, which includes computer storage media and hardware communication media, and communication media including any software, middleware, firmware, microcode and/or hardware medium that facilitates transfer of a computer program from one place to another.

As utilized herein, a computer storage media can be any physical media that can be accessed by a computer. By way of example, and not limitation, such storage media can comprise RAM, ROM, EEPROM, CD-ROM or other optical disk storage, magnetic disk storage or other magnetic storage devices, smart cards, and flash memory devices (e.g., card, stick, key drive . . . ), or any other suitable medium that can be used to carry or store program code in the form of instructions or data structures and that can be accessed by a computer. Hardware communication media can include any suitable device or data connection that facilitates transfer of a computer program from one entity to another at least in part utilizing electrical, mechanical and/or electromechanical hardware. In general, a data connection is also properly termed a computer-readable medium. For example, if a program, software or other data is transmitted from a website, server, or other remote source using a coaxial cable, fiber optic cable, twisted pair, digital subscriber line (DSL), communication bus structure, Ethernet, or wireless technologies such as infrared, radio, and microwave, then the coaxial cable, fiber optic cable, twisted pair, DSL, or wireless technologies such as infrared, radio, and microwave are included in the definition of medium, and any suitable hardware components associated with such medium are included in the definition of hardware communication media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a device-readable medium, machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 illustrates an exemplary wireless communication system 100 configured to support a number of users, in which various disclosed embodiments and aspects can be implemented. As shown in FIG. 1, system 100 provides communication for multiple cells, such as macro cells 102a, 102b, 102c, 102d, 102e, 102f, 102g (alternatively, macro cells 102a-102g), with each cell being serviced by a corresponding access point (AP) 104a, 104b, 104c, 104d, 104e, 104f, 104g (alternatively, APs 104a-104g). Each cell 102a-102g can be further divided into one or more sectors. Various UTs 106a, 106b, 106c, 106d, 106e, 106f, 106g, 106h, 106i, 106j, 106k (alternatively, UTs 106a-106k) are dispersed throughout system 100. Each AT 106a-106k can communicate with one or more APs 104a-104g on a forward link (FL) and/or reverse link (RL) at a given moment, depending on whether an AT (106a-106k) is active or whether it is in soft handoff, for example. The wireless communication system 100 can provide service over a large geographic area; for example, macro cells 102a-102g can cover a few blocks of a neighborhood.

Figure 2:
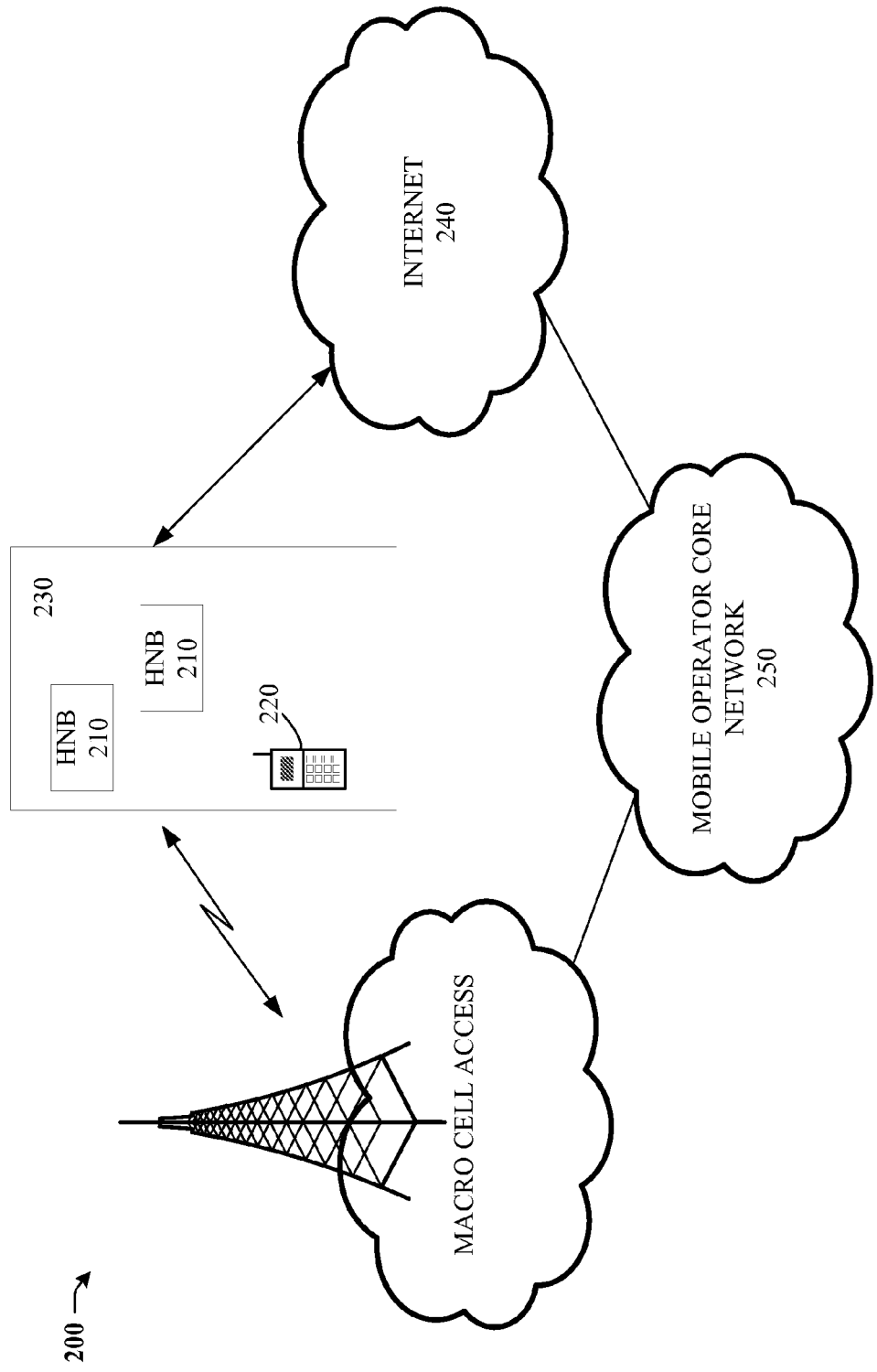
FIG. 2 illustrates a block diagram of a sample wireless network comprising heterogeneous access point base stations according to other aspects.

FIG. 2 depicts an exemplary communication system 200 to enable deployment of access point BSs (e.g., HNBs) within a network environment. System 200 includes multiple access point BSs including HNBs 210, each of which are installed in corresponding small scale network environments. Examples of small scale network environments can include user residences, places of business, indoor/outdoor facilities 230, and so forth. The HNBs 210 can be configured to serve associated UTs 220 (e.g., included in a CSG associated with HNBs 210), or optionally alien or visitor UTs 220 (e.g., that are not configured for the CSG of the HNB 210). Each HNB 210 is further coupled to the Internet 240 and a mobile operator core network 250 via a DSL router (not shown), or, alternatively, a cable modem, broadband over power line connection, satellite Internet connection, or a like broadband Internet connection (not shown).

To implement wireless services via HNBs 210, an owner of the HNBs 210 subscribes to mobile service, such as 3G mobile services, offered through the mobile operator core network 250. Also, the UE 220 can be capable to operate in a macro cellular environment and/or in a residential small scale network environment, utilizing various techniques described herein. Thus, at least in some disclosed aspects, HNB 210 can be backward compatible with any suitable existing UE 220. Furthermore, in addition to the macro cell mobile network 250, UE 220 is served by a predetermined number of HNBs 210, specifically HNBs 210 that reside within a corresponding user residence(s), place(s) of business, or indoor/outdoor facilities 230, and cannot be in a soft handover state with the macro network 250. It should be appreciated that although aspects described herein employ 3GPP terminology, it is to be understood that the aspects can also be applied to 3GPP technology (Release 99 [Rel199], Rel5, Rel6, Rel7), as well as 3GPP2 technology (1xRTT, 1xEV-DO Rel0, RevA, RevB) and other known and related technologies.

Figure 3:
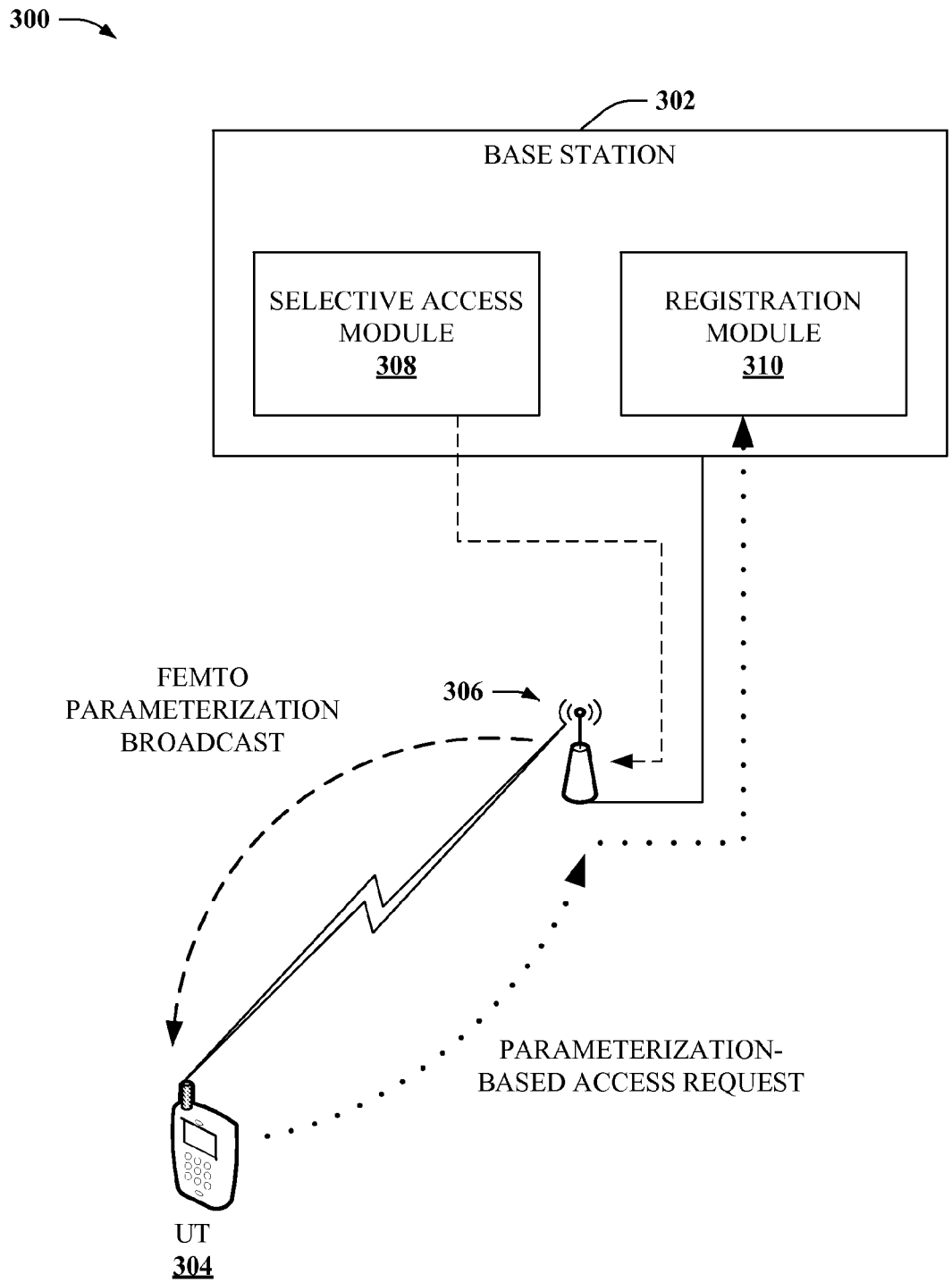
FIG. 3 illustrates a block diagram of an example system that provides Femto cell parameterization according to one or more other aspects.

FIG. 3 illustrates a block diagram of an example system 300 that facilitates preferred searching or handoff as a function of type or category of BS according to aspects of the subject disclosure. The preference can be dependent upon capabilities of a UT 304, upon a location of the UT 304, load of a network, or like system implementation factors. It should be appreciated that system 300 can comprise multiple wireless access points of disparate access type. In such an environment, facilitating UT preference for a specified type of access point can lead to efficient load balancing, reduced signaling overhead (e.g., especially in dense un-planned deployments), increased likelihood of acquiring a home BS associated with the UT, or an increased capacity to remain connected to the home BS once such BS is acquired.

System 300 comprises a BS 302, which can be in a network of neighboring BSs (not depicted) of disparate type or category. Examples of different types/categories of base stations include GA or RA BSs, full re-use or fractional re-use BSs, high power (e.g., macro cell) or low power (e.g., pico cell, Femto cell) BSs, or the like or combinations thereof. The BS 302 comprises a wireless transceiver 306 utilized to transmit data with a geographic area served by the BS 302. Transmitted data includes broadcast data pertinent to many or all remote terminal devices (304) within the geographic area, unicast data transmitted to a particular UT 304, or selective channels that transmit data to a subset of such devices. Broadcast data typically includes acquisition and synchronization pilot signals, which include information utilized to identify and decode data transmitted by BS 302 (e.g., an ID of BS 302, a PLMN ID associated with BS 302, time frame and sub-slot synchronization timing, scrambling codes for coded channels, and so on), and control channel information utilized to configure variable parameters of the UT 304 to communicate with the BS 302. Unicast data can typically include traffic and control channel information particular to a remote terminal. Selective channels can include paging channels and other control channels that can deliver information to selected UTs.

As one particular example to illustrate preferred parameterization, assume BS 302 can be either a GA macro BS or a RA BS, such as an HNB. The BS 302 comprises a selective access module 308 that transmits a parameterization scheme configured to direct a UT 304 to search for and/or acquire a particular type or category of BS. Thus, for instance, the parameterization can increase likelihood that UT 304 identifies RA BSs over GA BSs, or vice versa. In some such aspects, the parameterization provides a relative priority hierarchy for BS 302 and neighboring BSs (not shown) depending on a type of such BS. Particularly, the priority hierarchy can provide a first priority to BS 302 if BS 302 is a RA BS, and a second priority, different from the first priority, if BS 302 is a GA BS. Alternatively, or in addition to the foregoing, the priority hierarchy can assign relative priority to different frequency channels employed by network BSs. Frequencies employed by high priority BSs can be also be given relatively high priority, whereas frequencies exclusively employed by high priority BSs can be given highest priority. Likewise, frequencies dominated by low priority BSs can be given relatively low priority, and frequencies exclusively utilized for low priority BSs can be given lowest priority. Optionally, the priority can be dependent on RA-capabilities of UT 304. If UT 304 does not have an HNB subscription, for instance, the priority hierarchy can provide higher priority to GA BSs than RA BSs, to increase a likelihood that UT 304 will camp on and/or handoff to a GA BS rather than an RA BS. An example of such a priority hierarchy can include a hierarchical cell structure (HCS) employed in W-CDMA networks. The term hierarchical cell structure, although utilized as a specific parameter in the CDMA context, is employed in the subject description and appended claims in a generic sense and refers to any suitable priority leveling for BSs and/or cells/sectors of a network, which can include priority leveling for frequency channels employed by such BSs. An HCS can provide a common priority leveling for the BSs and frequency channels, or can provide separate priority levels for BSs and channels.

In addition to the foregoing, parameterization can be configured to modify a likelihood that UT 304 will search for neighboring BSs, depending on a type of BS (302) the UT 304 is served by or camping on. Because signal strength and/or quality is a variable entity, changing with position of the UT 304, BS loading, interference from BSs and/or UTs in neighboring cells (not depicted), topological interference, and so on, a particular BS 302 might not provide the best signal at a particular point in time. UT 304 can be configured to search for and analyze signals of neighboring BSs (302) to identify the best available signal(s). Searching can be initiated periodically in some aspects, to detect periodic changes in relative signal strength/quality of neighboring BSs and identify a BS having the best signal characteristics. In other aspects, searching can be initiated if a signal that the UT 304 is currently camped on or served by falls below a threshold value. Neighboring BSs having better signals can be added to an active handoff set, camp on the cell, or handoff to the cell. For UTs 304 with no RA-capable services, this procedure can be maintained as a default. However, RA-capable UTs 304 can obtain significant benefits when served by a home HNB, and thus can prefer to remain on the home HNB even where a neighboring cell provides a better signal. Accordingly, modification to the default rule of searching for and acquiring the best signal can be helpful, especially in an HNB-capable network and for an HNB-capable UT (304).

To implement modified BS searching, a search parameter is established that provides a minimum signal strength and/or quality threshold for a serving/camped on signal. If such signal falls below the threshold, the UT 304 searches for neighboring BSs having better signals. If the signal stays above the threshold, the UT 304 does not search for neighboring BSs (or, e.g., only searches for BSs having a same or higher priority). To implement preference for a particular type of BS, the threshold can be set relatively low for a preferred BS type and/or set relatively high for a non-preferred BS type. Thus, the UT 304 is more likely to search for stronger signals from nearby BSs when camping on/served by the non-preferred BS, and less likely to search for nearby BSs when camping on/served by the preferred BS. In some aspects, the search parameter can be coupled with the HCS priority, discussed above. By coupling the HCS and search parameters, the UT 304 can be configured to search only for same or higher priority BSs (302) if strength/quality of a received signal is above the search parameter threshold. If, however, the strength/quality drops below the search parameter threshold, the UT 304 can then search for neighboring BSs of a lower hierarchical priority level.

In additional aspects, modified BS searching can be implemented as a function of channel frequency for multi-frequency wireless systems. Thus, for instance, an inter-frequency and/or intra-frequency search parameter can be established, having thresholds below which UT 304 searches for BSs on separate frequencies and/or other BSs on the same frequency, respectively, as compared with a frequency of a current signal (e.g., serving signal, camped signal). To implement a preference for BS type (e.g., RA BSs), a preferred type of BS is provided a low relative inter/intra frequency search parameter, and a non-preferred type of BS is provided a high relative inter/intra frequency search parameter. Thus, when served by the preferred BS (302), UT 304 tends not to search other frequencies and/or within the frequency for other BSs. Likewise, when served by a non-preferred BS, UT 304 is more likely to search for other frequencies (e.g., to identify a frequency comprising preferred BSs 302) and/or for other BSs on the current frequency.

Alternatively, or in addition to the foregoing, selective access module 308 can configure parameters that control handoff from one BS (302) to another. Like the search parameters, the handoff parameters can be weighted to increase likelihood of handoff to a preferred BS (302), and decrease likelihood to a non-preferred BS. Additionally, the preferred/non-preferred BSs can be defined as a function of type or category of BS (e.g., RA, GA). Further, definition of preferred/non-preferred can be dependent on capabilities of UT 304. As an example, if UE 304 is configured for a first type of BS but not a second type, handoff (as well as a BS/frequency priority hierarchy and search) parameters preferring the first type of BS can be forwarded to the UE 304. Likewise, if UE 304 is configured for or obtains preferred service from the second type of BS, parameters preferring the second type of BS can be forwarded to the UE 304. In still other aspects, if UE 304 has no particular preference, default parameters for macro network access can be forwarded to the UE 304.

It should be appreciated that UT 304 capabilities and/or preferences can be obtained in various suitable ways. In one example, the capabilities/preferences can be obtained from a user subscription profile sent by a home location register (HLR—not depicted). In other examples, the capabilities/preferences can be stored in memory at UT 304 and forwarded to BS 302. In the latter case, selective access module 308 can broadcast default parameterization, optionally preferring one or another type of BS as described above, via transceiver 306 and then transmit (306) a specialized set of parameters to UT 304 once the capabilities/preferences of the UT 304 are obtained at BS 302.

Parameterization received at UT 304 can be employed in conjunction with BS and/or wireless channel search, acquisition or handoff procedures, as described above. Thus, UT 304 can camp on signals transmitted by BS 302 or attempt to access a mobile network via the BS 302. To access the mobile network, UT 304 requests network access and submits information identifying the UT 304 and a subscriber account associated with the UT 304. Optionally, a CSG identifier of the UT 304 can also be included with the network access request (e.g., if UT 304 has an HNB subscription) to facilitate access to a home HNB associated with UT 304. In other aspects, the CSG identifier can be included in subscription profile information obtained from a network operator's HLR. Registration module 310 can employ the subscription and/or CSG identifier information to determine whether to allow or deny the request for network access. If BS 302 is a GA BS, the determination to allow or deny can be based on whether UT 304 has a subscription with an operator. If BS 302 is an RA BS, the determination can be based on whether UT 304 has both a subscription with an operator and is included within a CSG associated with the BS 302. If the request for access is approved by registration module 310, UT 304 can initiate and/or receive communication services, including voice or data calls, Internet access, or the like.

Figure 4:
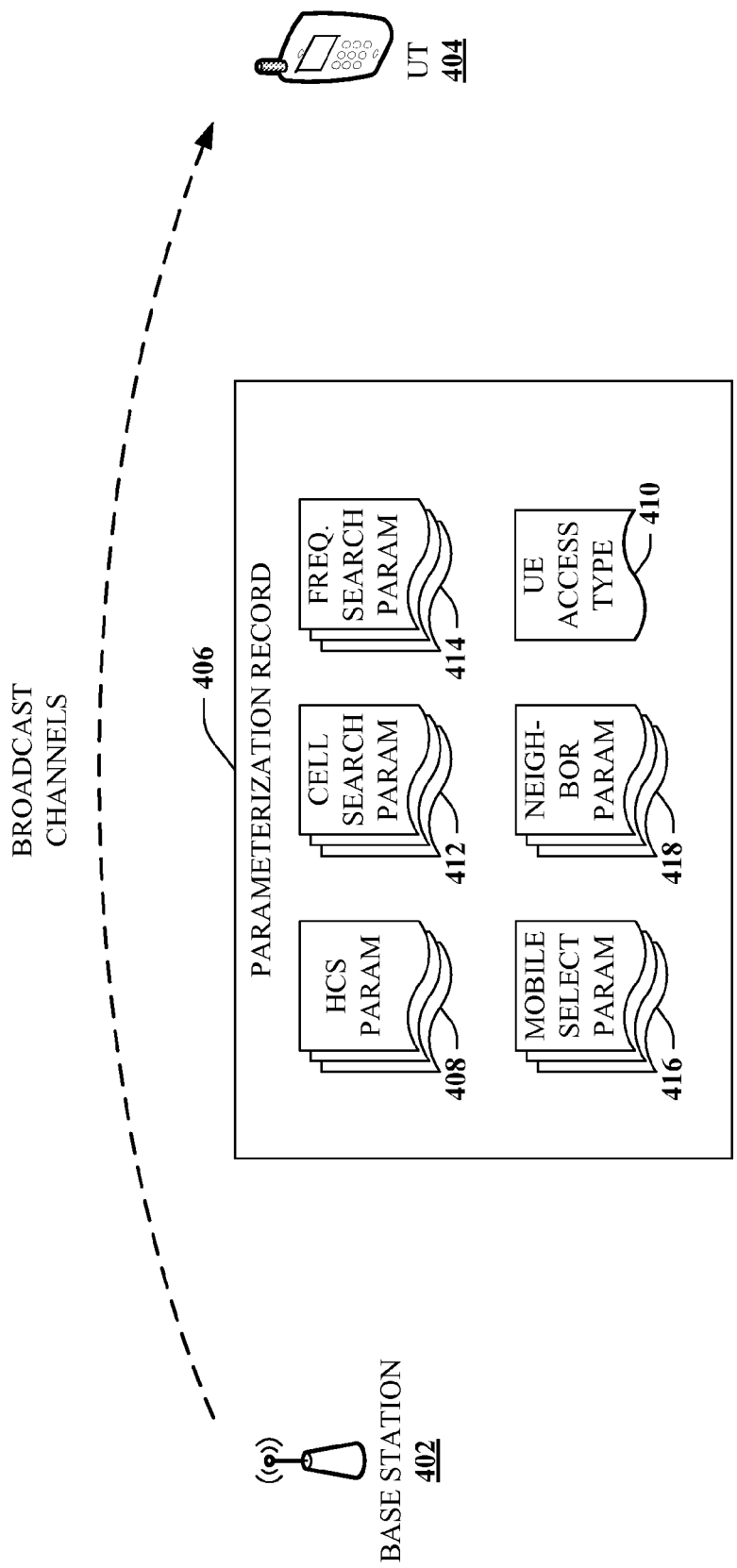
FIG. 4 depicts a block diagram of a sample parameterization record for directing UTs to Femto or macro access points.

FIG. 4 illustrates a block diagram of an example parameterization record 406 transmitted by a network BS 402 to a UT 404. The parameterization record 406 can be broadcast by BS 402 to UTs 404 within a sector of a wireless communication network served by the BS 402. According to some aspects of the subject disclosure, the parameterization record 406 can provide threshold parameters that weight a likelihood of UT 404 searching for, acquiring and/or handing off to a particular type of network, or type of network BS (402). Accordingly, the parameterization record 406 can be utilized in a network comprising disparate access type BSs (402), such as RA BSs and GA macro BSs, to direct UTs (404) to one or another type of BS. Selection of a preferred and/or non-preferred BS (402) can be based on sector load, UT capabilities, inter-sector interference, and so forth.

The parameterization record 406 can comprise an HCS parameter 408 that establishes relative priority of BS 402 and neighboring BSs (not depicted) in a wireless access network. The HCS parameter 408 can be coupled with a cell search parameter 412 to modify default search parameters of the UT 404. Thus, for instance, the HCS parameter 408 can provide a relative priority (e.g., comprising quantitative priority such as a numerical scale, or qualitative priority such as high, medium, low or other relative indicators) for BSs (402) of different access type, different re-use type (e.g., full re-use, fractional re-use, etc.), different transmit power (e.g., 50 watt macro cell, 25 watt micro cell, 5 watt pico cell, 1 watt Femto cell, or some other suitable combination of network cell size and transmit power), different access technology (e.g., wireless fidelity [WiFi], worldwide interoperability for microwave access [WiMAX], licensed cellular radio frequency), or the like, or a combination thereof. The cell search parameter 412 can establish one or more minimum thresholds for various types of BSs (402), below which threshold(s) the UT 404 can search for a first set of BS types and above which threshold(s) UT 404 can search for a second set of BS types. In some aspects, the set(s) of BS types can be established by the HCS priority parameter 408.

As one example of the foregoing, the HCS parameter 408 establishes three priorities, low priority for GA BSs of any suitable type, medium priority for fractional re-use BSs (e.g., micro or pico cells that employ only a fraction of a channel's bandwidth, which can be more efficient than full re-use BSs that employ all of the channel's bandwidth), and high priority for HNBs. The cell search parameter 412 can then establish a high minimum threshold for low priority BSs (e.g., such as GA macro cell BSs), a medium minimum threshold for medium priority BSs, and a low minimum threshold for high priority BSs. In such case, if UT 404 is served or camping on an HNB, so long as the signal of the HNB meets the low minimum threshold, the UT 404 will not search for other BSs, or optionally will search only for other high priority BSs. If, however, the UT 404 is served by a medium priority fractional re-use BS, so long as the signal of the fractional re-use BS meets the medium minimum threshold, UT 404 will search only for high priority BSs, or optionally for other medium priority BSs having better signal than the serving fractional re-use BS. If the serving BS is a low priority BS, the UT 404 will search for high or medium priority BSs if the signal strength meets the high minimum threshold, and any other suitable BS if the signal strength does not meet the high minimum threshold. Specific examples of the HCS parameter 408 and cell search parameter 412 in a WCDMA network are the HCS_PRIO parameter and $S_{searchHCS}$ parameters, respectively. It should be appreciated, however, that the subject disclosure is not limited to WCDMA networks and parameters. Rather, other suitable wireless network systems having analogous BS priority and search parameters, such as 3GPP LTE, UMB, WiMAX, UMTS, and so on, are contemplated as part of the subject disclosure.

Parameterization record 406 can also include a UE access type 410 parameter that includes some capabilities of the UT 404. The capabilities can be obtained from the UT 404, or from a network operator's HLR, or other suitable network data source. Additionally, the UE access type 410 can be utilized as a selective parameterization flag, selecting one of multiple sets of parameters 408, 412, 414, 416, 418 configured for various UT capabilities and contained in the parameterization record 406. Thus, to continue the foregoing example, if the UE access type for UT 404 is GA macro network only, a different set of HCS parameters 408 and cell search parameters 412 can be provided to and/or selected by the UT 404, instead of those listed in the example above. For instance, the HCS parameter 408 can give high priority to GA macro BSs and low priority to RA BSs. In addition, the cell search parameter 412 can establish a high minimum threshold for the RA BSs, increasing likelihood that UT 404 ignores such BSs or searches for other BSs when served by an RA BS, and a low minimum threshold for GA BSs. It should be appreciated that other suitable priority and search parameter configurations can exist, which are correlated to different UT capabilities. For instance, a different set of parameters can be established for multi-mode WiFi/Cellular UTs (404), establishing priority for WiFi access points, cellular access points, or both, compared with other access point types (e.g., WiMAX).

In addition to the foregoing parameters, parameterization record 406 can further comprise a frequency search parameter 414, mobile selection parameter 416, and a neighbor cell parameter 418. Examples of the foregoing parameters in the WCDMA context can include an $S_{INTERSEARCH}$ parameter (e.g., for searching between different available frequency channels of a network), $S_{INTRASEARCH}$ parameter (e.g., for searching within a frequency channel) and Qhyst1$_S$ and Qoffset1$_{S,N}$, (e.g., for determining whether to handoff to another BS or add another BS to an active handover set). In similar fashion as described above, the frequency search parameter 414, mobile cell selection parameter 416 and neighbor cell selection parameter 418 can be established with varying minimum thresholds per HCS priority type. Additionally, sets of preferred and non-preferred parameters 414, 416, 418 can be provided as a function of UE access type 410. Thus, for instance, if UT 404 is RA-capable, the parameters 414, 416, 418 can establish low minimum thresholds for RA BSs, such as HNBs, and medium and/or high minimum thresholds for other types of BSs. In such case, the UT 404 is more likely to search within and between frequency channels and handoff to RA BSs, and more likely to remain camped on/served by RA BSs.

Figure 5:
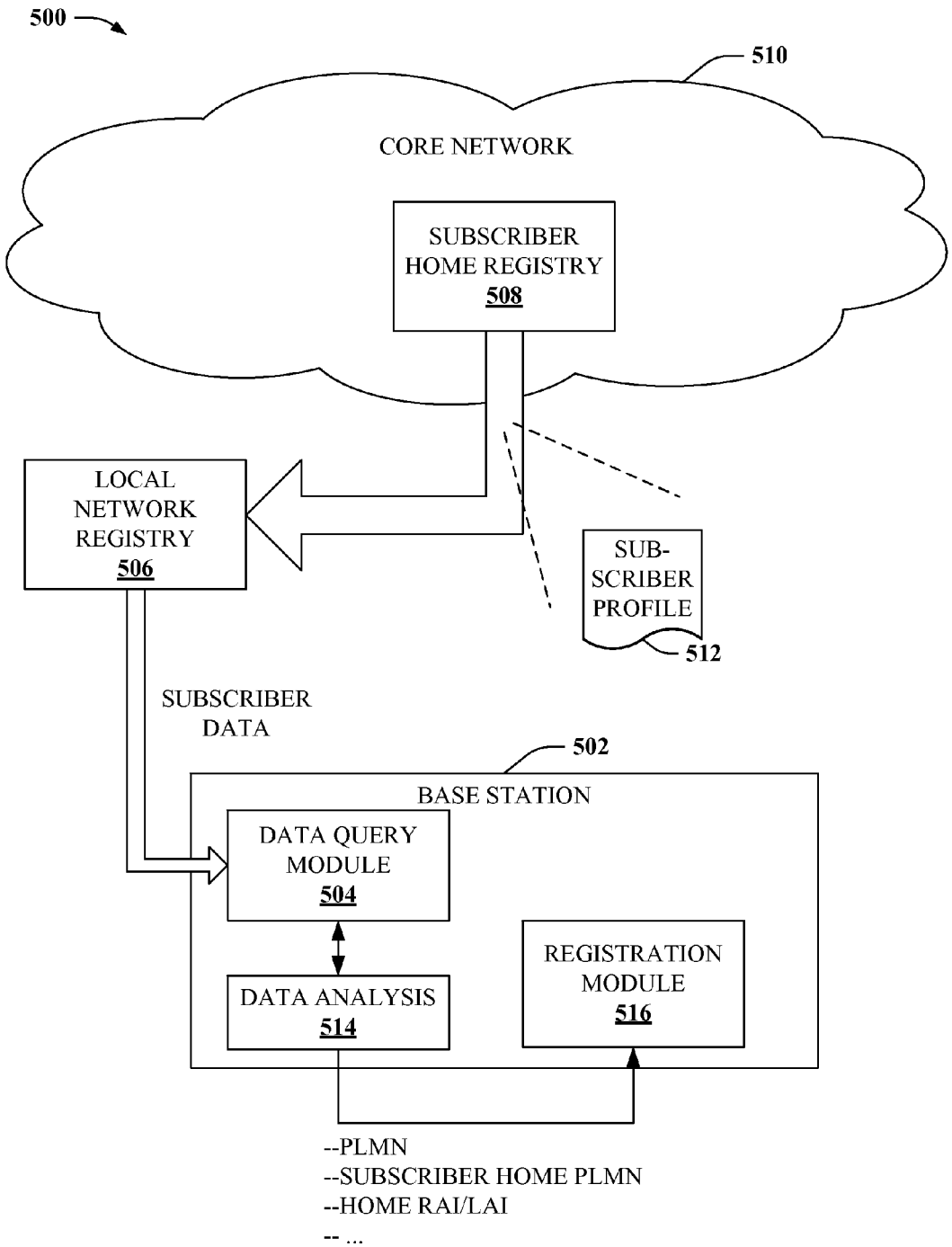
FIG. 5 illustrates a block diagram of an example system for providing UT-specific parameterization according to further aspects.

FIG. 5 illustrates a block diagram of an example system 500 that provides selective parameterization for network BSs based on UT-specific information. As described herein, the UT information can be employed to configure different parameterization depending on capabilities of a UT, or select among pre-configured sets of parameters for different UTs. Accordingly, system 500 can provide backward compatibility for legacy UTs (e.g., macro-only UTs) and specialized service for dual-mode, multi-mode, RA-capable, etc., UTs in a network comprising disparate access type BSs. Thus, system 500 can mitigate wasted or redundant signaling to BSs that a UT is not capable of or not configured for accessing, and can also load balance UTs among various access points in the network. Results of such configuration can lead to improved acquisition of favored access points (e.g., a home HNB, a WiFi router) as well as reduced UT processing and improved battery life.

System 500 comprises a BS 502, which can be any suitable BS capable of interfacing with a mobile communication operator's core network 510. Thus, BS 502 can comprise a GA BS, a WiMAX access point, an HNB or WiFi access point coupled to the core network 510 (e.g., 3GPP core network) via the Internet (not depicted, but see FIG. 2, supra, at 210, 240, 250), or the like. BS 502 typically broadcasts network information identifying a type of network (510) coupled to BS 502 (e.g., a PLMN ID identifying an operator of the network 510), as well as BS information distinguishing BS 502 from other network BSs (not depicted). In some aspects, the network information can comprise a specialized PLMN ID reserved for a network of a particular type. For instance, the PLMN ID can be reserved for, and identify BS 502 as, an HNB of a Femto cell network, a WiFi access point of a WiFi network, a WiMAX access point of a WiMAX network, or other suitable node of an access point network capable of interfacing to the core network 510.

Upon obtaining a wireless signal from a UT (not depicted), BS 502 can analyze the signal to determine whether a specialized PLMN ID associated with BS 502 is included in the signal. If so, BS 502 can assume that the UT is attempting to access the network as a specialized UT (e.g., RA-capable UT). BS 502 can attempt to authorize the UT to determine whether such special access is permitted. Thus, for instance, if BS 502 is an HNB, a CSG of the BS 502 can be referenced to determine whether the UT is included in the CSG. If so, full access to BS 502 and core network 510 can be provided the UT. Otherwise, limited or no access is provided.

In addition to specialized PLMN ID information, BS 502 can extract identification information pertaining to the UT (e.g., a mobile subscriber identity [MSI], international mobile subscriber identity [IMSI], etc.). A data query module 504 can employ the UT identification information and request subscriber data from a local network registry 506. In the cellular context, the local network registry 506 can comprise a mobile switching center (MSC)/visitor location registry (VLR) of a global system for mobile communications (GSM) or UMTS network, a Serving General packet radio system (GPRS) Support Node (SGSN) in a GSM, CDMA or WCDMA network, or the like. For other access point networks, such as an HNB, WiFi, or WiMAX network, local network registry can comprise network equipment analogous to the MSC/VLR or SGSN, or can simply comprise a database for storing and managing data and a network interface and processing card authorized to access the operator's core network and obtain subscriber information.

Upon obtaining the request for subscriber data from data query module 504, local network registry 506 can submit the UT identification information to the operator's core network 508. In response, a subscriber home registry 508 (e.g., an HLR) can provide a subscriber profile 512 to the local network registry 506. The local network registry can extract subscriber data from the subscriber profile 512 and forward the data to data query module 504 in response to the above query.

The subscriber data can be provided to an analysis module 514 that parses the data to identify subscriber information pertinent to determining whether to allow access to the UT, what type of access to allow, what type of services can be supplied to the UT, and the like. Such information can include service plan type, subscription information of the UT, PLMN ID of the UT's service provider, suitable specialized PLMN IDs associated with the UT, access capabilities of the UT, voice and/or data service capabilities of the UT, multimedia capabilities of the UT, and so on. If the subscriber information indicates that the UT should have access to BS 502, a registration module 516 can approve access, and transmit information suitable to conduct communication with the BS 502 (e.g., including scrambling codes, traffic channel configurations, and other suitable communication parameters).

According to some aspects of the subject disclosure, the subscriber profile information can include a home PLMN region associated with the UT. In at least one aspect, the home region identifies a particular geographic area or network area (e.g., a coverage area of a particular macro cell or a group of macro cells, particular municipality, city, county, township, etc., or the like) in which a home HNB of the UT resides. Thus, when the UT is within the home PLMN region, the UT can expect to locate a home HNB associated with the UT. Where the UT is not within the home PLMN region, the home HNB will not be expected.

To determine whether a UT is within a specified home PLMN region, BS 502 can compare the home PLMN region to location information associated with the BS 502. If it is determined that the UT is within a home PLMN region, a specialized PLMN ID associated with HNB BSs is transmitted to the UT. According to particular aspects, the specialized PLMN ID can furthermore be listed as an equivalent PLMN ID of the UT's operator network. Accordingly, the UT can then search for, handoff to, camp on, etc., HNBs that broadcast the specialized PLMN ID as if they were macro BSs associated with the operators PLMN ID. Thus, the UT can treat the PLMN ID as an equivalent of the operator's PLMN ID.

In one or more other aspects, if the UT is determined to be within a home PLMN region, BS 502 can further transmit a parameterization set that establishes HNBs as preferred BSs, as described herein. Accordingly, not only can the UT consider HNBs as equivalent to macro networks in the home PLMN region, the UT can be more likely to search for, handoff to, and remain camped on/served by HNBs. As such, a probability that UT will discover its home HNB is increased. If, on the other hand, the UT is determined to not be within the home PLMN region, the specialized PLMN ID is withheld from the UT, and only the operator PLMN ID associated with the UT is provided. Accordingly, the UT can ignore HNBs that broadcast the specialized PLMN ID, since it can be assumed that such HNBs are not the UT's home HNB, and therefore will not provide full access or any access to the UT. Accordingly, system 500 can reduce or eliminate signaling to HNBs in regions other than the home PLMN region, and also increase a likelihood that the UT discovers the home HNB within the home PLMN region.

It should be appreciated that the home PLMN region, although described above in the singular, can include more than one geographic region or network area. Thus, for instance, if the UT is included within a CSG of two HNBs that are in separate specialized PLMN ID regions (e.g., on region being at a subscribers residence, and another region being at the subscriber's office), the home PLMN region can include both specialized regions, or the specialized region can be defined so as to include two or more geographic areas or network coverage areas (e.g., see FIG. 6, infra). Accordingly, the home PLMN region can be a flexible identifier adapted to individual subscribers.

Figure 6:
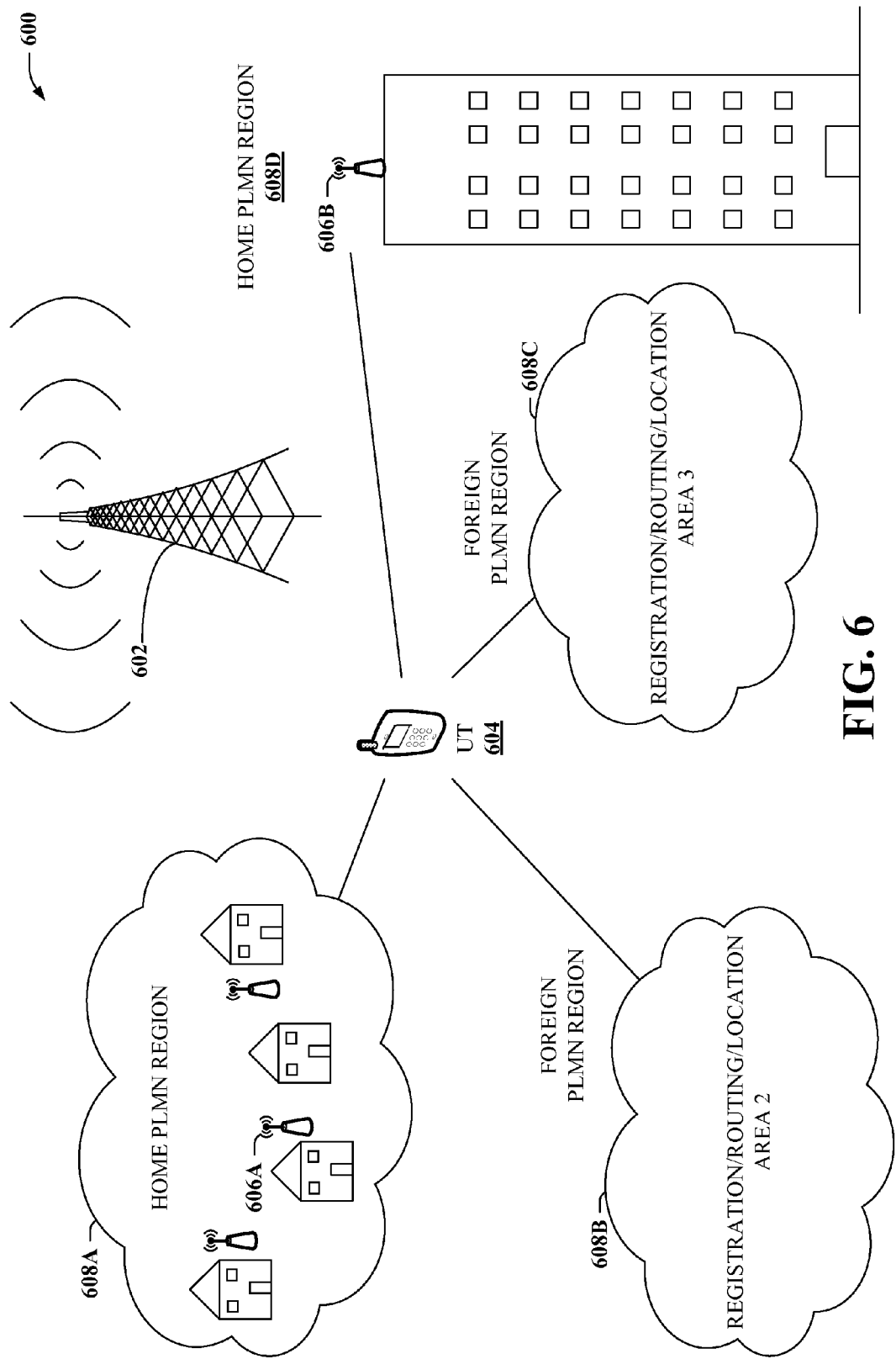
FIG. 6 depicts a block diagram of an example wireless network providing a Femto PLMN and home regions according to other aspects.

FIG. 6 illustrates a block diagram of an example network environment 600. Network environment 600 comprises several network regions, 608A, 608B, 608C, 608D (608A-608D). The network regions can be defined by geographic area (e.g., housing district, municipality, township, county, etc.) or network region, such as a location area identifier (LAI) or routing area identifier (RAI). The network regions 608A-608D can also be provided wireless communication services via a mobile communication operator's terrestrial access points 602 (e.g., base stations). The network regions, LAIs, RAIs, etc., can be defined by the mobile communication operator as part of macro network coverage (602).

As depicted, network environment 600 comprises at least four network regions 608A-608D. The regions 608A-608D are described as a function of access relationship to a UT 604. Thus, the regions 608A-608D comprise a first home PLMN region 608A, a first foreign PLMN region 608B, a second foreign PLMN region 608C and a second home PLMN region 608D. Home PLMN regions 608A, 608D include at least one home HNB 606A, 606B associated with the UT 604. The home HNBs 606A, 606B include a CSG, which comprises information identifying a set of UTs (604) that have access to the home HNBs 606A, 606B. UTs not included within the CSG are provided only limited or no network access/communication services. Likewise, UTs included within the CSG are provided full access/communication services provided by the HNBs 606A, 606B.

As UT 604 travels throughout the network environment 600, communication services can be obtained from the macro network access points 602. However, the UT 604 can obtain preferential services (e.g., increased bandwidth, increased data rates, higher quality of service, reduced rate plans, etc.) from a home HNB 606A, 606B as compared with the macro network access points 602. In addition, by utilizing the home HNBs 606A, 606B, macro network load is reduced. Accordingly, it is beneficial for UT 604 to obtain access from the home HNBs when possible. Under legacy network parameters, UT 604 can interface with home HNB BSs 606A, 606B in a substantially similar manner as macro BSs 602. Thus, the UT 604 can search for the strongest signal and camp on/request access from whichever BS (602, 606A, 606B) provides the strongest or best quality signal. When outside of the PLMN regions 608A-608D, the macro network can likely provide the best signal, and will typically be selected by the UT 604. However, if the UT 604 is within one of the PLMN regions 608A-608D comprising one or more HNBs (606A, 606B), nearby HNBs can have much better signal characteristics than the distant macro BS 602. Thus, the UT 604 will be more likely to search for, camp on and request access from the HNBs. Since a deployment of HNBs can typically contain many more foreign HNBs (e.g., in which UT 604 is not included in a CSG) than home HNBs, UT 604 can be exposed to many access rejections in attempting to access the strongest nearby signal. Such a result can lead to significant processing overhead and reduction in battery life for UT 604.

To mitigate the foregoing problem, a specialized PLMN ID is assigned to HNBs 606A, 606B of the network environment 600. The specialized PLMN ID can be unique among operator PLMN IDs, and thus distinct from a PLMN ID of the macro network 602. In addition, regions of HNBs can be defined, optionally matching the regions 608A-608D of the operator's network (e.g., LAI regions, RAI regions, etc.). Upon subscribing to an HNB wireless subscription, UT 604 is associated with one or more home PLMN regions 606A, 606D. In general, when UT 604 is within a foreign PLMN region 606B, 606C, UT 604 can ignore signals comprising the specialized PLMN ID. Thus, excess signaling associated with attempting access to strong signals of nearby foreign HNBs can be mitigated. However, when UT 604 is within the home PLMN region(s) 606A, 606D, the network 600 can transmit the specialized PLMN ID as an equivalent of the operator's PLMN ID. Accordingly, within the home PLMN regions 606A, 606D, UT 604 can search for and request access from HNBs 606A, 606B, as well as the macro network 602. As described herein, the network can further provide parameters configured to increase a likelihood that UT 604 will find and access HNBs over the macro network. Accordingly, an average time that the UT 604 requires to discover the home HNB 606A, 606D, as opposed to foreign HNBs within the home PLMN regions 606A, 606D, can be reduced.

In at least some aspects of the subject disclosure, UT 604 can be configured to improve detection of the home HNBs 606A, 606B within the home PLMN regions 608A, 608D, in addition to the parameterization described herein. In one example, UT 604 can record an ID of HNBs that reject network access to the UT 604 and include the IDs in a restricted list, or blacklist. By 'remembering' which HNBs are restricted, the UT 604 can avoid signaling to HNB IDs on the restricted list, reducing signaling and saving battery power. In addition to the foregoing, UT 604 can store an HNB ID of home HNBs 606A, 606B that permit access to the UT 604. The home HNB IDs can be included in a preferred list, and signals including the home HNB IDs can be given priority over other signals. Thus, the UT 604 can camp on or request access from the home HNBs 606A, 606B and ignore signals of other BSs (e.g., so long as the signal from the home HNB is at last above a low relative threshold, as described herein).

Figure 7:
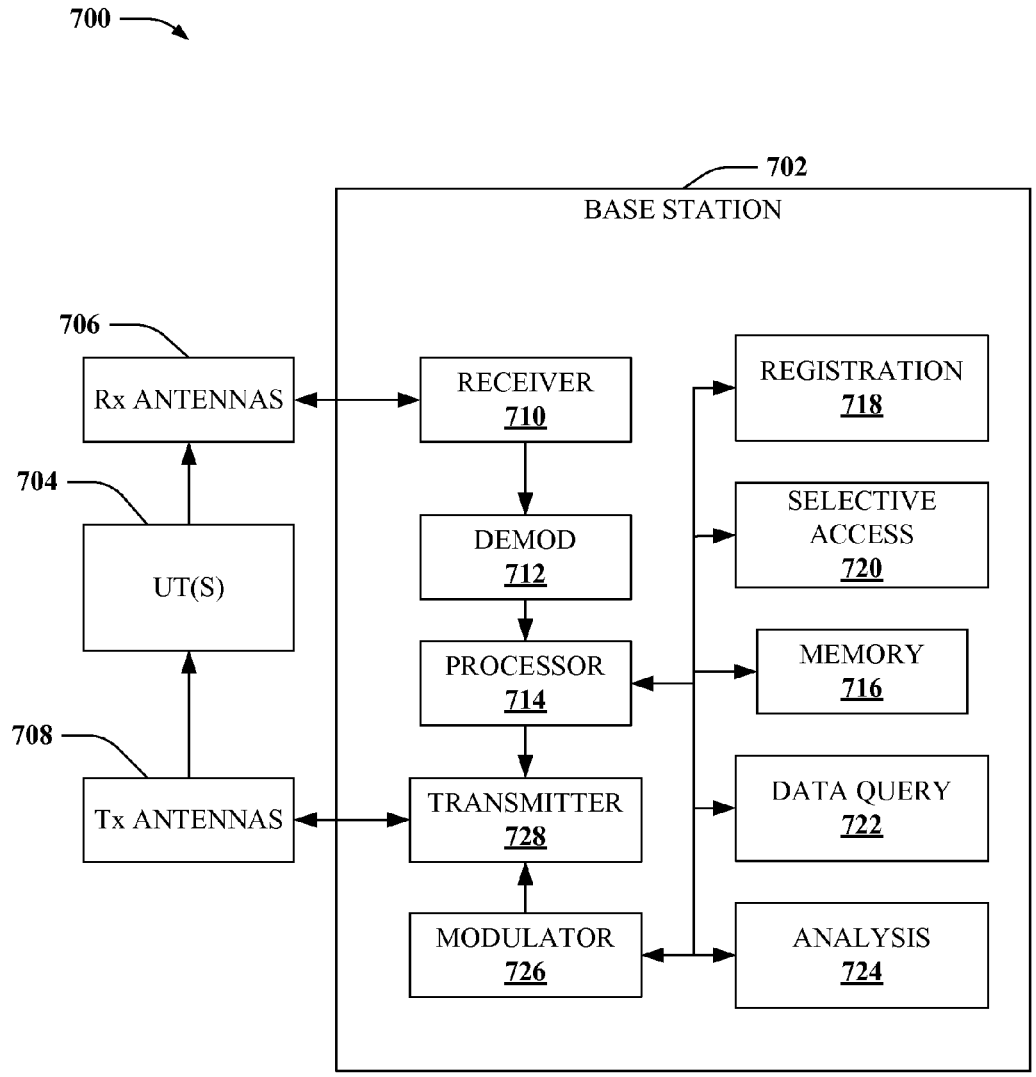
FIG. 7 illustrates a block diagram of an example base station that facilitates mobile access in a disparate access point wireless network.

FIG. 7 depicts a block diagram of an example system 700 comprising a BS 702 and one or more UTs 704 (e.g., mobile devices) according to aspects of the subject disclosure. Base station 702 can be configured to provide parameterization for weighting search and/or access priority for UTs 704 as a function of BS type, as described herein. Such parameterization can increase a likelihood that UTs 704 will discover/access one type of BS, or to decrease a likelihood that UTs 704 will discover/access a second type of BS. In some aspects, the parameters provided can be based on capabilities of the UTs 704.

BS 702 (e.g., access point, . . . ) can comprise a receiver 710 that receives signal(s), and over-the-air (OTA) messages from one or more UTs 704 through one or more receive antennas 706, and a transmitter 728 that transmits coded/modulated OTA messages provided by modulator 726 to the one or more UTs 704 through a transmit antenna(s) 708. Receiver 710 can receive information from receive antennas 706 and can further comprise a signal recipient (not shown) that receives uplink data transmitted by UT(s) 704. Additionally, receiver 710 is operatively associated with a demodulator 712 that demodulates received information. Demodulated symbols are analyzed by a processor 714. Processor 714 is coupled to a memory 716 that stores information related to functions provided by base station 702. In one instance, stored information can comprise sets of parameters configured to establish preferred and non-preferred BSs (702). Particularly, the stored information can comprise parameters establishing an HCS prioritizing RA BSs relative to GA BSs, and employing RA-capabilities of UTs 704 to set the relative priorities, as described herein.

Additionally, processor 714 can be coupled to a selective access module 720. Selective access module 720 can establish and transmit a set of UT parameters that increases a probability that the UT 704 will obtain and access an RA BS, or decreases a probability that the UT 704 will access a GA BS in favor of the RA BS. Additionally, BS 702 can comprise a registration module 718 that can obtain a request for access from UTs 704 and allow or deny the access. Access can be based on subscriber profile information (e.g., whether the profile contains an active subscription), or whether the profile information is included in a CSG associated with BS 702. Subscriber profile information can be obtained via a data query module 722 that can couple with network data stores (e.g., VLR) and obtain subscriber data from a subscriber profile. Particular subscriber information can be extracted by an analysis module 724 that parses the subscriber data. Analysis module 724 can identify subscription information, PLMN IDs associated with the UTs 704, home PLMN regions associated with the UTs 704, UT capabilities (e.g., RA-capable, multi-mode, etc.), and the like, as described herein. Accordingly, data query module 722 and analysis module 724 can obtain the information required to registration module 718 to allow or deny access to the UTs 704.

Figure 8:
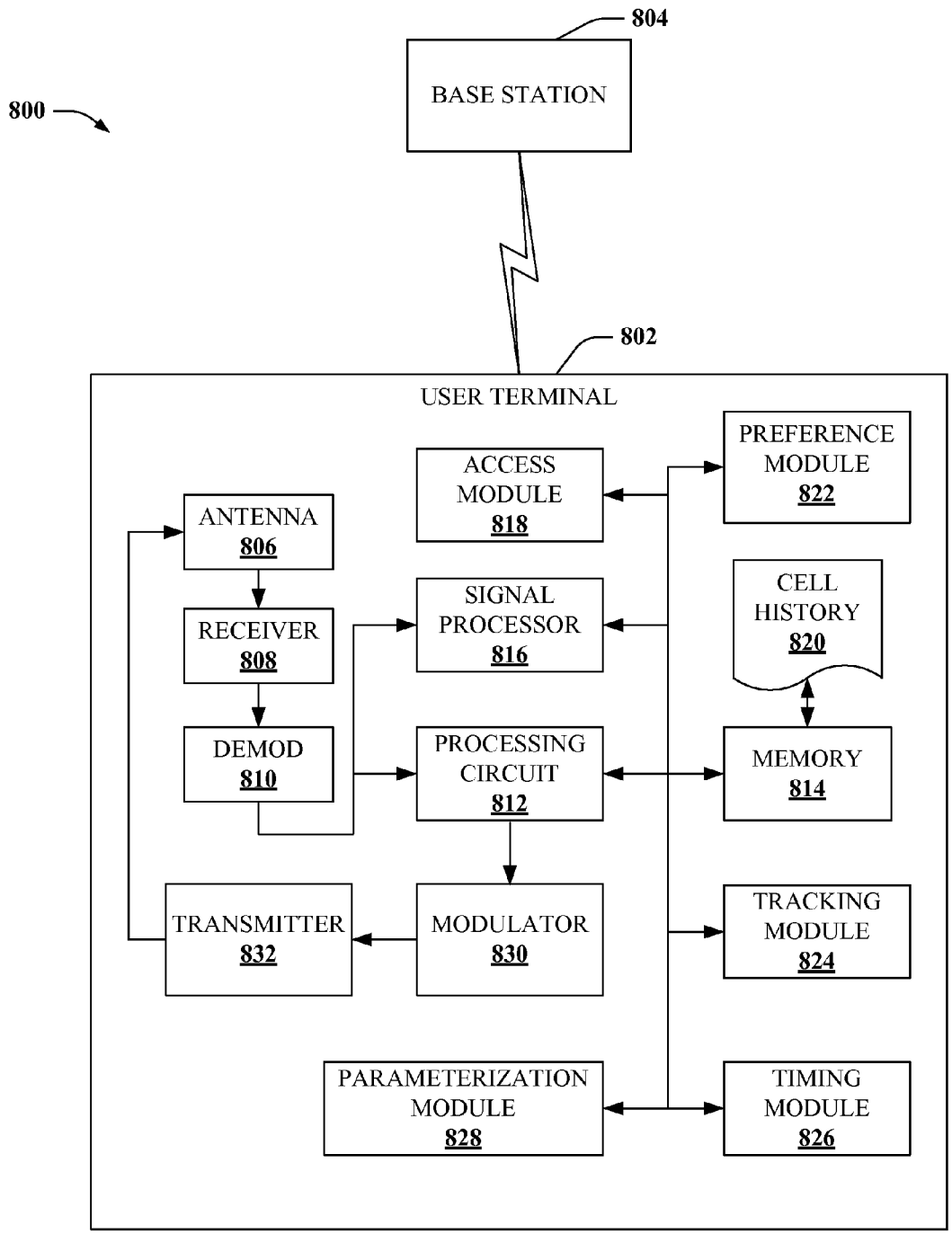
FIG. 8 depicts a block diagram of a sample UT for accessing restricted access (RA) and general access (GA) base stations of a wireless network.

FIG. 8 illustrates a block diagram of an example system 800 comprising a UT (e.g., mobile device) 802 that can be configured to interface with a wireless BS 804. UT 802 can be configured to wirelessly couple with one or more such BSs 804 (e.g., access point) of a wireless network. UT 802 can receive OTA signals from the BS 804 on a FL channel and respond with OTA signals and messages on a RL channel, as known in the art. In addition, UT 802 can obtain BS search and access parameterization transmitted by the BS 804. The parameterization can be based on a type (e.g., transmit power, access type, re-use type) of the BS 804 and neighboring BSs (not depicted), and optionally based on access capabilities of the UT 802, as described herein.

UT 802 includes at least one antenna 806 (e.g., a transmission receiver or group of such receivers comprising an input interface) that receives a signal and receiver(s) 808, which performs typical actions (e.g., filters, amplifies, down-converts, etc.) on the received signal. According to at least some aspects, processor(s) 812 can selectively analyze portions of signals received from demodulator 810 and obtain synchronization and/or control information pertinent to a selected base station (804) or type of base station. In general, antenna 806 and transmitter 832 (collectively referred to as a transceiver) can be configured to facilitate wireless data exchange with base station(s) 804.

Antenna 806 and receiver(s) 808 can also be coupled with a demodulator 810 that can demodulate received symbols and provide them to processor(s) 812 for evaluation. It should be appreciated that processor(s) 812 can control and/or reference one or more components (806, 808, 810, 814, 816, 818, 820, 822, 824, 826, 828) of the UT 802. Further, processor(s) 812 can execute one or more modules, applications, engines, or the like (816, 818, 822, 824, 826, 828) that comprise information or controls pertinent to executing functions of the UT 802. For instance, such functions can include scanning received wireless signals for a PLMN ID of an operator associated with BS 804, a distinguishing ID of BS 804, an equivalent PLMN ID of specialized network access points (e.g., HNBs, WiFi access points, WiMAX access points, etc.), employ search and/or access parameterization to establish and identify preferred BS types over non-preferred BS types, or like operations, as described herein.

UT 802 can additionally include memory 814 that is operatively coupled to processor(s) 812. Memory 814 can store data to be transmitted, received, and the like, and instructions (820) suitable to conduct wireless communication with a remote device (804). Further, memory 814 can store the modules, applications, engines, etc. (816, 818, 822, 824, 826, 828) executed by processor(s) 812, above. UT 802 can additionally comprise a signal processor 816 that obtains a set of parameters configured to weight a probability of employing an RA or GA BS (804) to interface with a wireless network. In one aspect, signal processor 816 can obtain a parameter that establishes a relatively low threshold below which the UT 802 searches for non RA BSs if the UT 802 is served by an RA BS (804). In other aspects, the signal processor 816 can obtain a parameter that establishes a relatively low threshold below which the UT 802 searches for BSs that utilize a frequency of the wireless network employed by the GA BSs. According to still other aspects, signal processor 816 can obtain RA-capabilities of the UT 802 stored in memory 814, or provided by BS 804 (e.g., from a subscriber profile stored on a network). A parameterization module 826 can employ the RA-capabilities to adjust UT parameters to increase a likelihood of obtaining and accessing RA BSs if the UT is RA-capable, or decrease a likelihood of signaling RA BSs if the UT 802 is a not RA-capable.

Parameters obtained by the signal processor 816 can be provided to an access module 818 that employs the parameters in selecting analyzed signals for access, handoff, or like determinations. In some aspects of the subject disclosure, UT 802 can comprise a BS preference module 822 that prioritizes BSs (804) as a function of BS type or category. BS type/ category can include access type, re-use type, transmit power type, or the like, as described herein. Particularly, the BS preference module 822 can obtain an HCS from received wireless signals and establish relative priority levels for different types of BSs (804) as provided by the HCS.

According to further aspects, signal processor 816 can obtain a regional PLMN ID of the BS and a PLMN ID reserved for RA BSs. Where the UT 804 is within a home region defined by the regional PLMN ID, the reserved PLMN ID can be established as an equivalent of an operator's PLMN ID. In such case, the access module 818 can submit the reserved PLMN ID and regional PLMN ID to the BS 804, to facilitate accessing BSs associated with the reserved PLMN ID.

In other aspects, UT 802 can comprise an access tracking module 824 that records in memory 814 the regional PLMN ID as a preferred or non-preferred ID. Specifically, the PLMN ID can be recorded in a cell access history file 820 as a favored ID if the BS 804 is a home RA BS of the UT (e.g., a home HNB). Otherwise, if the BS 804 is a foreign RA BS, the access tracking module 824 can record the PLMN ID as an excluded ID in the cell access history file 820. Access module 818 can reference the history file 820 to determine whether an access request is to be submitted to a particular BS (804). A BS containing an excluded ID can be ignored, whereas a BS containing a favored ID can be given high search/access priority. Additionally, the parameterization module 826 can increase a threshold below which the UT searches for or accesses BSs (804) on a frequency of the wireless network utilized by RA BSs if the regional PLMN ID of the BS is a favored regional ID.

In particular aspects, UT 802 can further comprise a timing module 826 that establishes a delay time if an access request is rejected by BS 804. The delay time can prevent the UT 802 from rapidly signaling many RA BSs in a dense deployment of foreign HNBs, for instance. In such aspects, the UT 804 can preserve significant battery power in non home environments.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include HNBs 210, Internet 240, macro network 602, and UT 802 or a different combination of these and other components. Sub-components could also be implemented as components communicatively coupled to other components rather than included within parent components. Additionally, it should be noted that one or more components could be combined into a single component providing aggregate functionality. For instance, data query module 504 can include data analysis module 514, or vice versa, to facilitate querying subscriber profile information and analyzing the information by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 9:
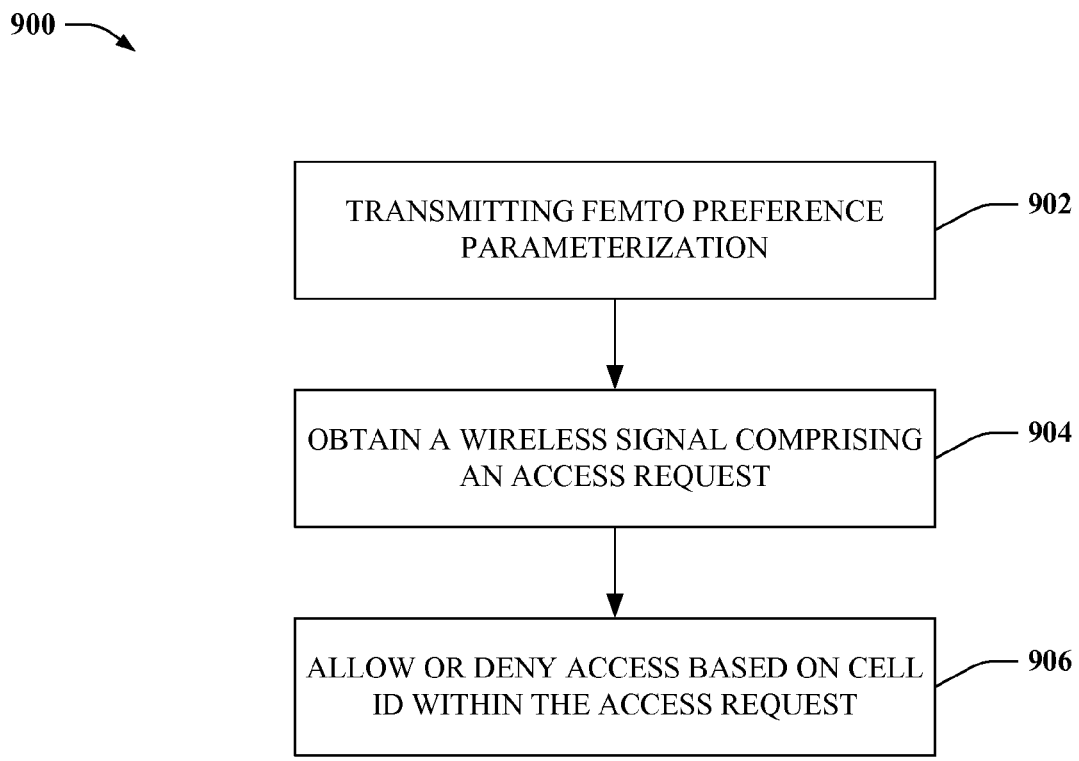
FIG. 9 illustrates a flowchart of a sample methodology for weighting UT access to one or more disparate types of base stations in wireless communications.

FIG. 9 illustrates a flowchart of a sample methodology 900 for weighting UT access to one or more disparate types of base stations in wireless communications. At 902, method 900 can transmit base station preference parameterization to a sector of a wireless network served by the base station. The parameterization can establish a relative hierarchy for base stations of the wireless network, indicating a priority level for various base station types. In one example, the parameterization can establish a high priority for RA base stations, increasing a probability that a UT will obtain and access RA base stations, or establish a low priority for GA base stations, decreasing a probability that the UT will obtain and access GA base stations. In other examples, higher priority can be provided GA base stations over RA base stations, or other base station types (e.g., re-use base stations, low power base stations), to implement load balancing, reduced interference, and the like.

At 904, method 900 can obtain a wireless signal comprising an access request. The access request can include identification information of a device transmitting the signal. Additionally, the information can specify a PLMN ID or regional/home PLMN ID associated with the device. At 906, method 900 can allow or deny access to a wireless network based on the identification information provided in the request. In one aspect, allowing or denying can be based on whether the identification information is included in a CSG. In other aspects, allowing or denying access can be based on whether the regional/home PLMN ID is an ID associated with a receiving base station. Thus, access to the wireless network can be conditioned on receiving information provided in the parameterization transmitted at reference number 902.

Figure 10:
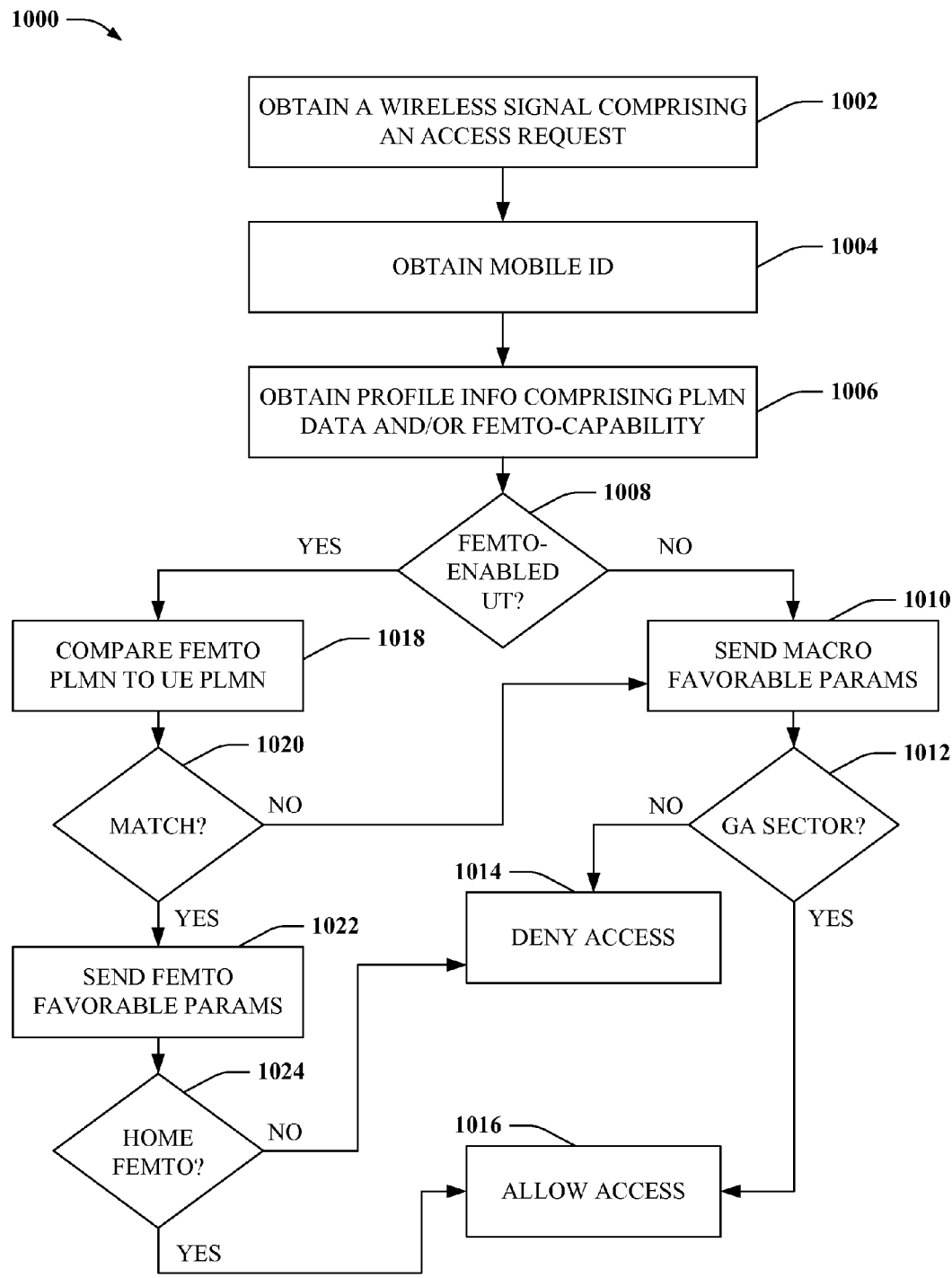
FIG. 10 depicts a flowchart of an example methodology for UT access point parameterization in a heterogeneous access point environment.

FIG. 10 depicts a flowchart of an example methodology 1000 for UT access point parameterization in a heterogeneous access point environment. At 1002, method 1000 can obtain a wireless signal comprising an access request to a wireless network. At 1004, method 1000 can obtain a mobile ID of a requesting UT from the wireless signal. At 1006, method 1000 can obtain profile information comprising PLMN data and/or Femto-capability data of the requesting UT. The profile information/capability data can be obtained from a network server, such as an HLR. At 1008, method 1000 can determine whether the requesting UT is configured to access a Femto base station. For instance, the profile information can be referenced to determine whether the requesting UT is associated with an active HNB subscription. If, at 1008, the requesting UT is determined to be Femto-enabled, method 1000 can proceed to 1018. Otherwise, method 1000 proceeds to 1010.

At 1010, method 1000 can send parameterization establishing a macro base station as a preferred base station. At 1012, a determination is made as to whether a receiving base station is a general access base station. If so, method 1000 can proceed to 1016, where access to the wireless network is allowed to the requesting UT. Otherwise, method 1000 can proceed to 1014 where access to the wireless network is denied the requesting UT.

At 1018, method 1000 can compare a PLMN ID reserved for Femto base stations to a PLMN ID associated with the requesting UT. At 1020, a determination is made as to whether the UT's PLMN ID matches the reserved PLMN ID. If so, method 1000 can proceed to 1022. Otherwise, method 1000 proceeds to 1010. At 1022, method 1000 can send parameterization establishing Femto base stations as preferred base stations. At 1024, a determination is made as to whether a receiving base station is a home base station for the requesting UT. If so, method 1000 proceeds to 1016 and access is allowed to the request UT. Otherwise, method 1000 proceeds to 1014, where access is denied the requesting UT.

Figure 11:
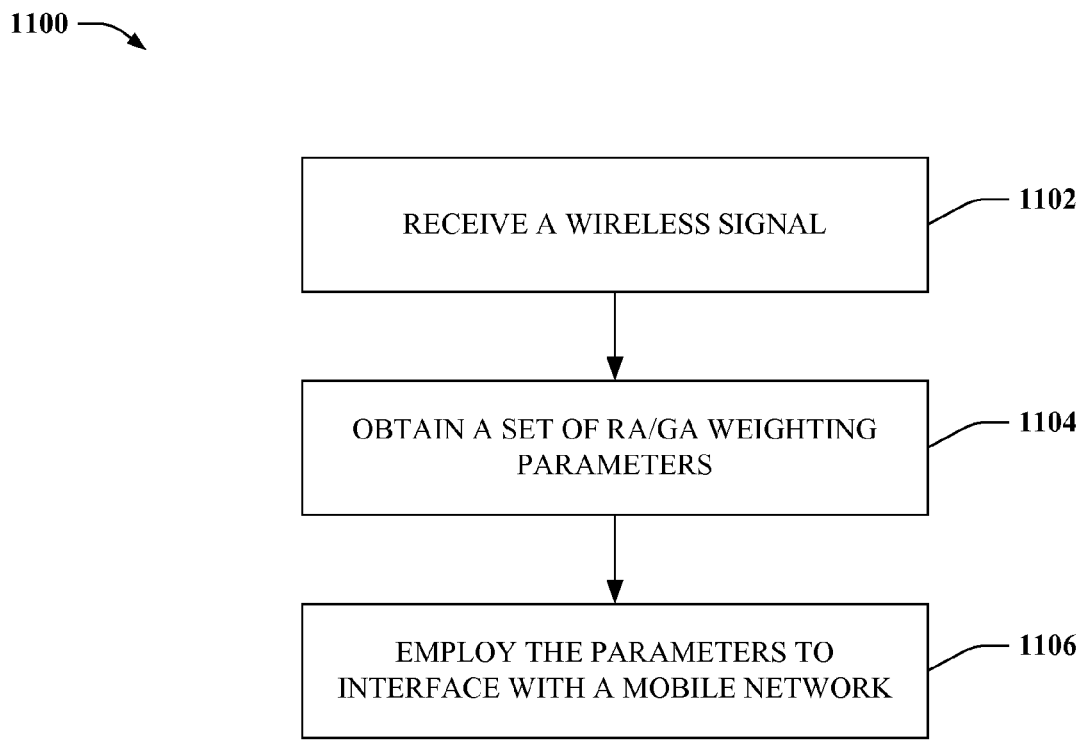
FIG. 11 illustrates a flowchart of an example methodology for employing weighted parameterization for interfacing with RA or GA base stations.

FIG. 11 illustrates a flowchart of an example methodology 1100 for employing weighted parameterization for interfacing with RA or GA base stations. At 1102, method 1100 can receive a wireless signal. At 1104, method 1100 can obtain a parameterization set from the wireless signal that establishes a particular type(s) of base station as a preferred base station. For instance, the preferred base station can be established as a higher priority base station as compared with non-preferred base stations. To implement the preference, the parameterization can provide a low relative search threshold, below which a UT searches for other base stations, when coupled to the preferred base station type, and a high relative search threshold when coupled to a non-preferred base station type. Search thresholds can modify likelihood that a UT searches for other base stations within a particular frequency channel, or searches across multiple frequency channels, or both. In addition, the parameterization can provide a low relative handoff threshold, below which the UT adds other base stations to an active handover set or implements a handoff, when coupled to the preferred base station type, and a high relative handoff threshold when coupled to the non-preferred base station type(s). At 1106, method 1100 can employ the parameterization to interface with a mobile network, searching for, camping on and requesting access from preferred base stations in lieu of non-preferred base stations. Accordingly, method 1100 can implement network load balancing among particular base station types, and reduce likelihood that UTs will expend processing and signaling resources on non-preferred base stations.

Figure 12:
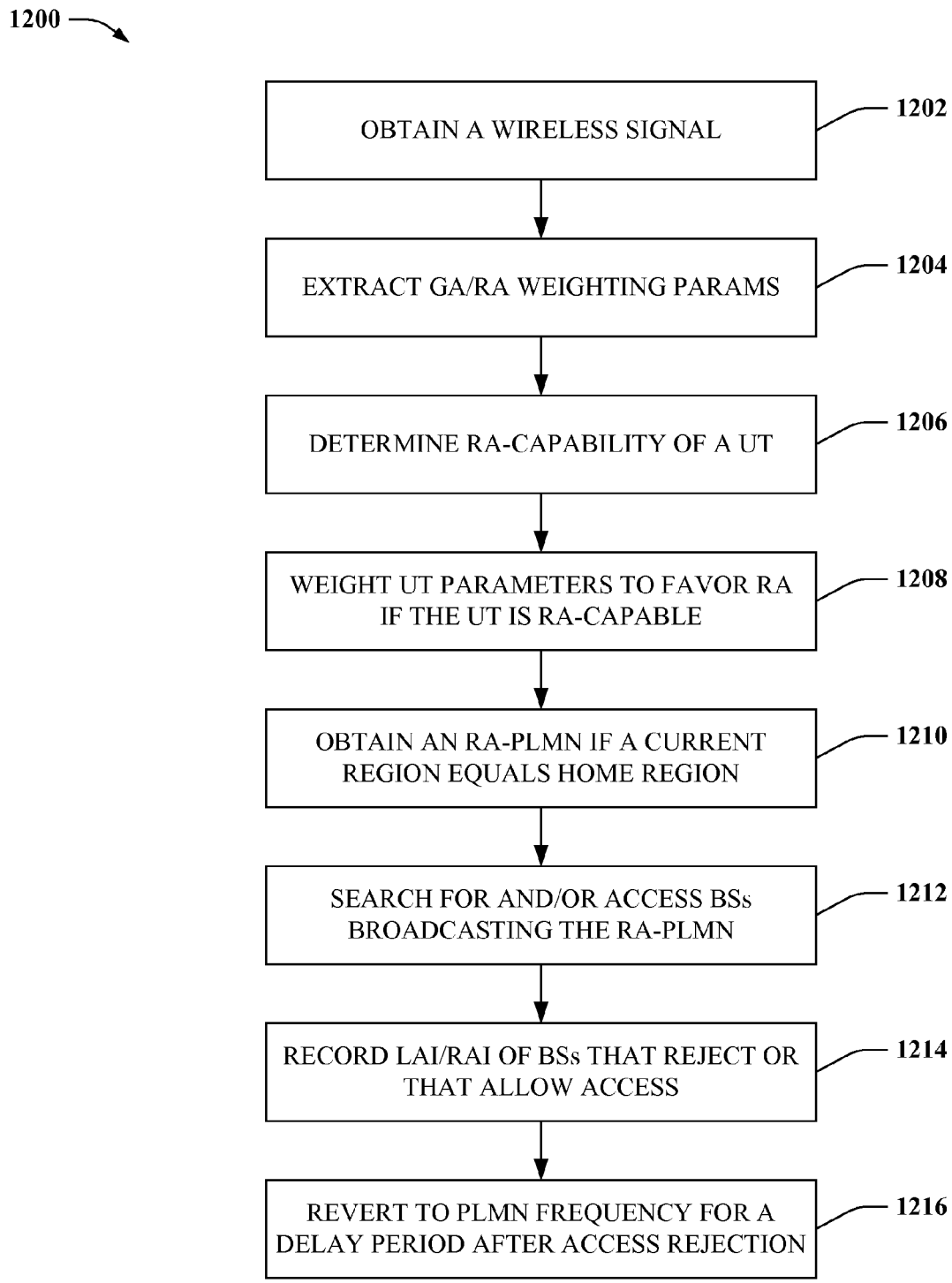
FIG. 12 depicts a flowchart of a sample methodology for weighting UT access functions based on RA capabilities of the UT.

FIG. 12 depicts a flowchart of a sample methodology 1200 for weighting UT access functions based on RA capabilities of the UT. At 1202, method 1200 can obtain a wireless signal from a wireless network access point, the wireless signal comprises a parameterization set configured to weight search and or access parameters for UTs within a wireless network. At 1204, method 1200 can extract general access or restricted access weighting parameters from the wireless signal. At 1206, method 1200 can determine restricted access capability of a UT receiving the wireless signal. At 1208, method 1200 can weight UT parameters to favor restricted access base stations over general access base stations if the UT is restricted access capable. Favored parameters can modify default search and/or access functions of the UT to increase a likelihood of the UT camping on and/or handing off to a restricted access base station. At 1210, method 1200 can analyze the wireless signal for network PLMN ID data. The PLMN ID data can be compared with PLMN IDs associated with a receiving UT, including reserved PLMN IDs associated with restricted access base stations and a regional home PLMN ID(s) associated with the receiving UT. At 1212, method 1200 can search for and/or access base stations broadcasting the PLMN ID, if such PLMN ID matches a reserved PLMN ID, regional PLMN ID and/or macro PLMN ID associated with the UT. At 1214, method 1200 can record regional and/or sector information of base stations that reject an access request by the UT. Rejecting sectors/regions can be associated with an excluded list to limit subsequent signaling to such sectors. Additionally, at 1216 method 1200 can revert to a macro PLMN frequency for a delay period after an access rejection. Reverting to the macro PLMN frequency can help avoid repetitive signaling in a densely populated foreign restricted access deployment.

Figure 13:
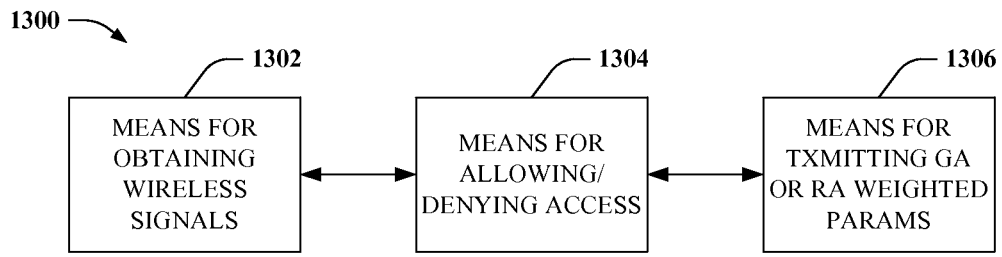
FIG. 13 illustrates a block diagram of a sample system that facilitates weighted parameterization for RA and GA access point wireless networks.
Figure 14:
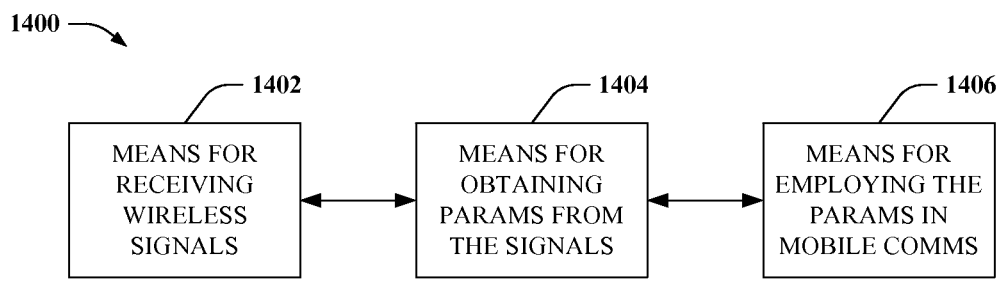
FIG. 14 depicts a block diagram of an example system that employs weighted wireless communication parameterization for accessing a wireless network.

FIGS. 13 and 14 depict block diagrams of example systems 1300, 1400 that implement control and facilitate control, respectively, of a remote device at least in part via a mobile network interface. For example, systems 1300, 1400 can reside at least partially within a wireless communication network and/or within a transmitter such as a node, base station, access point, user terminal, personal computer coupled with a mobile interface card, or the like. It is to be appreciated that systems 1300, 1400 are represented as including functional blocks, which can be functional blocks that represent functions implemented by a processor, software, or combination thereof (e.g., firmware).

System 1300 can comprise a means 1302 for obtaining a wireless signal comprising a network access request. The means 1302 can comprise a wireless transceiver configured to communicate over one or more wireless communication channels. Additionally, system 1300 can comprise a means 1304 for allowing or denying the network access request. Furthermore, system 1300 can comprise a means 1306 for transmitting a set of UT parameters that increases a probability that a UT will search for and/or handoff to a particular type of base station. Suitable base station types can include disparate access type base stations, such as restricted or general access, disparate re-use type base stations, such as full re-use or fractional re-use, transmit power base stations such as high, medium and/or low power transmitters, and the like. In one specific aspect, the means 1306 can transmit a set of parameters that increase a probability that the UT will obtain and access a restricted access base station, or decreases a probability that the UT will access a general access base station. In addition to the foregoing, the parameterization can be transmitted by means 1306 employing means 1302 to particular UTs, such as restricted access-capable UTs. In such aspects, the system 1300 can increase a likelihood that a UT can identify and handoff to home restricted base stations associated with the UT.

System 1400 can comprise a means 1402 for receiving a wireless signal transmitted by a wireless network base station. The means 1402 can comprise an antenna and receiver for down-converting received signals. Additionally, system 1400 can comprise a means 1404 for obtaining a set of parameters configured for weighted search and/or access to access points of a wireless network. In some aspects, the means 1404 can extract parameters that weight a probability of employing a restricted access or general access base station to interface with the wireless network. In addition to the foregoing, system 1400 can comprise a means 1406 for employing the set of parameters to implement communication with the network. For instance, the means 1406 can analyze signals of a serving/ camped on base station and compare the signals to a threshold established by the parameters. As described herein, the thresholds can be weighted to provide preference for a particular type of base station, such as the restricted access or general access base station. Weighting can increase likelihood of searching base stations until a preferred base station is found, or increase a likelihood of remaining coupled to the preferred base station once such base station is found. Alternatively, or in addition, the weighting can decrease a likelihood of searching for non preferred base stations, or remaining coupled with non preferred base stations currently serving or being monitored. Accordingly, system 1400 facilitates network load balancing and preferential distribution of access terminals to one or more types of wireless network base stations.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of providing mobile access in a wireless network, comprising:
    obtaining a network access request from a first user terminal (UT) via a wireless signal, the network access request including identification information of the first UT;
    allowing or denying the network access request based on the identification information of the first UT; and
    transmitting, by a base station serving a sector of the wireless network, a set of one or more weighting parameters configured to weigh search and/or access parameters of a UT to increase a probability that the UT will access a restricted access base station (RA BS) or decrease a probability that the UT will access a general access base station (GA BS).

2. The method of claim 1, wherein the search and/or access parameters establish a higher priority for one type of base station (BS) over another BS type.

3. The method of claim 2, wherein a higher priority type of BS comprises an RA BS.

4. The method of claim 1, wherein increasing the probability that the UT will access an RA BS or decreasing the probability that the UT will access a GA BS comprises establishing a low relative threshold below which a UT served by an RA BS in the sector searches for neighboring sectors of the wireless network.

5. The method of claim 1, wherein increasing the probability that the UT will access an RA BS or decreasing the probability that the UT will access a GA BS comprises establishing a low relative threshold below which a UT served by an RA BS in the sector re-selects to a neighboring sector of the wireless network.

6. The method of claim 1, wherein increasing the probability that the UT will access an RA BS or decreasing the probability that the UT will access a GA BS comprises establishing a low relative threshold below which a UT served by an RA BS searches for neighboring RA BSs that share a common frequency with the GA BS.

7. The method of claim 1, wherein increasing the probability that the UT will access an RA BS or decreasing the probability that the UT will access a GA BS comprises establishing a low relative threshold below which a UT served by an RA BS searches for neighboring RA BSs on different frequencies than utilized by the GA BS.

8. The method of claim 1, wherein increasing the probability that the UT will access an RA BS or decreasing the probability that the UT will access a GA BS comprises establishing a high relative threshold below which a UT served by a GA BS searches for RA BSs.

9. The method of claim 1, further comprising obtaining a UT profile that indicates RA capabilities of the first UT, wherein the set of one or more weighting parameters increases a likelihood of the first UT accessing or handing off to an RA BS based on the first UT being an RA-authorized UT, or decreases a likelihood of the first UT signaling the RA BS based on the first UT being a non RA-authorized UT.

10. The method of claim 1, wherein an RA BS comprises a femto BS.

11. The method of claim 1, wherein allowing or denying the network access request comprises:
    determining whether the first UT is an RA-authorized UT;
    based on the first UT being an RA-authorized UT, comparing an identifier (ID) reserved for RA BSs to an ID associated with the first UT; and
    transmitting the set of one or more weighting parameters when the ID reserved for the RA BSs matches the ID associated with the first UT.

12. The method of claim 11, further comprising:
    based on the UT not being an RA-authorized UT, transmitting the set of one or more weighting parameters configured to weigh the search and/or access parameters of the UT to increase the probability that the UT will access a GA BS or decrease a probability that the UT will access an RA BS.

13. The method of claim 1, wherein allowing or denying the network access request comprises:
    determining whether an RA BS is a home BS for the first UT;
    allowing the network access request based on the RA BS being the home BS for the first UT; and
    denying the network access request based on the RA BS not being home BS for the first UT.

14. A base station, comprising:
    a transceiver that obtains a wireless signal comprising a network access request from a first user terminal (UT), the network access request including identification information of the first UT;
    a registration module that allows or denies the network access request based on the identification information of the first UT; and
    a selective access module that employs the transceiver to transmit a set of one or more weighting parameters configured to weigh search and/or access parameters of a UT to increase a probability that the UT will access a restricted access base station (RA BS) in a sector or to decrease a probability that the UT will access a general access base station (GA BS) in the sector.

15. The base station of claim 14, wherein the registration module that allows or denies the network access request is further configured to:
    determine whether the first UT is an RA-authorized UT;

based on the first UT being an RA-authorized UT, comparing an identifier (ID) reserved for RA BSs to an ID associated with the first UT; and transmits the set of one or more weighting parameters when the ID reserved for the RA BSs matches the ID associated with the first UT.

16. A method of accessing a wireless network, comprising:
receiving, at a user terminal (UT), a wireless signal transmitted by a wireless network base station (BS);
obtaining from the wireless signal a set of one or more weighting parameters configured to weigh search and/or access parameters of the UT to increase a probability of the UT employing a restricted access base station (RA BS) or decrease a probability of the UT employing a general access base station (GA BS) to interface with the wireless network; and
employing the search and/or access parameters to implement communication with the wireless network.

17. The method of claim 16, wherein the search and/or access parameters establish a higher priority for one type of base station (BS) over another BS type.

18. The method of claim 17, wherein a higher priority type of BS comprises an RA BS.

19. The method of claim 16, wherein increasing the probability that the UT will access an RA BS or decreasing the probability that the UT will access a GA BS comprises obtaining a parameter from the search and/or access parameters that establishes a low threshold below which a UT served by an RA BS searches for non-RA BSs.

20. The method of claim 16, wherein increasing the probability that the UT will access an RA BS or decreasing the probability that the UT will access a GA BS comprises obtaining a parameter from the search and/or access parameters that establishes a low threshold below which a UT searches for BSs that utilize a frequency of the wireless network employed by GA BSs.

21. The method of claim 16, wherein increasing the probability that the UT will access an RA BS or decreasing the probability that the UT will access a GA BS comprises obtaining a parameter from the search and/or access parameters that establishes a high threshold below which a UT searches for a frequency of the wireless network employed by RA BSs.

22. The method of claim 16, wherein a UT profile indicates RA capabilities of the UT served by the wireless network, and further comprising at least one of:
employing the set of one or more weighting parameters to weigh the search and/or access parameters to increase a likelihood of accessing an RA BS based on the UT being an RA-capable UT, or
employing the set of one or more weighting parameters to weigh the search and/or access parameters of the UT to decrease a likelihood of searching for an RA BS based on the UT being a non RA-capable UT.

23. The method of claim 16, further comprising:
obtaining a regional public land mobile network (PLMN) identifier (ID) of the BS and a PLMN ID reserved for RA BSs as an equivalent of a home PLMN ID of the UT when the UT is RA-capable.

24. The method of claim 23, further comprising at least one of:
recording the regional PLMN ID as a favored regional ID based on access being obtained; or
recording the regional PLMN ID as an excluded regional ID based on access being rejected.

25. The method of claim 24, further comprising searching for or accessing BSs on a frequency of the wireless network utilized by RA BSs when the regional PLMN ID of the BS is the favored regional ID.

26. The method of claim 16, further comprising at least one of:
obtaining access to the BS when the BS is a home RA BS of the UT.

27. The method of claim 15, wherein an RA BS comprises a femto BS.

28. The method of claim 16, further comprising refraining from searching for BSs on a frequency utilized for RA BSs for a delay period when access to the BS is rejected.

29. A user terminal (UT) configured for accessing a wireless network, comprising:
a transceiver that obtains a wireless signal transmitted by a wireless network base station (BS);
a signal processor that obtains from the wireless signal a set of one or more weighting parameters configured to weigh search and/or access parameters of the UT to increase a probability of the UT employing a restricted access base station (RA BS) or decrease a probability of the UT employing a general access base station (GA BS) to interface with the wireless network; and
an access module that employs the search and/or access parameters to implement communication with the wireless network.

30. The user terminal of claim 29, wherein a UT profile indicates RA capabilities of the UT served by the wireless network, and wherein the signal processor is further configured to:
employ the set of one or more weighting parameters to weigh the search and/or access parameters to increase a likelihood of accessing an RA BS based on the UT being an RA-capable UT, or
employ the set of one or more weighting parameters to weigh the search and/or access parameters of the UT to decrease a likelihood of searching for an RA BS based on the UT being a non RA-capable UT.

31. A method of providing mobile access in a wireless network, comprising:
transmitting, by a base station serving a sector of the wireless network, a set of one or more weighting parameters configured to weigh search and/or access parameters of a user terminal (UT) to increase a probability that the UT will access a local area base station or decrease a probability that the UT will access a macro area base station;
obtaining a network access request from a first UT via a wireless signal, the network access request including identification information of the first UT;
allowing or denying the network access request based on the identification information of the first UT.

32. The method of claim 31, wherein the local area base station comprises a restricted access base station, a Home Node B (HNB), or a Femto base station.

33. The method of claim 31, wherein the identification information of the first UT comprises an international mobile subscriber identity (IMSI).

34. The method of claim 31, wherein obtaining the network access request comprises obtaining the network access request based on a cell access history of the first UT.

35. The method of claim 34, wherein obtaining the network access request based on the cell access history of the first UT comprises obtaining the network access request based on the first UT determining that the base station is a preferred base station based on the cell access history of the first UT.

36. The method of claim 34, wherein the base station receives the cell access history of the first UT from the first UT.

37. The method of claim 34, wherein the cell access history of the first UT is recorded by the first UT.

38. The method of claim 31, wherein obtaining the network access request comprises obtaining the network access request based on a mobility of the first UT.

39. The method of claim 38, wherein obtaining the network access request based on the mobility of the first UT comprises obtaining the network access request based on the first UT ignoring small area base stations having a base station identifier different than a base station identifier of the base station.

40. The method of claim 39, wherein the base station identifier of the base station comprises a Femto public land mobile network (PLMN) identifier.

41. The method of claim 31, wherein the identification information of the first UT comprises a PLMN identifier associated with the first UT.

42. The method of claim 41, wherein allowing or denying the network access request based on the identification information of the first UT comprises allowing or denying the network access request based on the PLMN identifier matching a PLMN identifier of the base station.

43. A method for assigning location area identifiers to small area base stations, comprising:
defining one or more network regions containing one or more small area base stations; and
assigning location area identifiers to the one or more small area base stations in the one or more network regions, wherein a location area identifier of a small area base station is different than a location area identifier of a macro area base station providing wireless service in a network region containing the small area base station, and wherein the location area identifier of the small area base station is transmitted by the small area base station to one or more user terminals in a coverage area of the small area base station.

44. The method of claim 43, wherein the assigning comprises assigning a different location area identifier to each of the one or more small area base stations in a network region.

45. The method of claim 43, wherein the assigning comprises assigning a same location area identifier to each of the one or more small area base stations in a network region.

46. The method of claim 43, wherein the location area identifier comprises a public land mobile network (PLMN) identifier.

47. The method of claim 46, further comprising:
transmitting a set of one or more weighting parameters configured to weigh search and/or access parameters of a user terminal (UT) to increase a probability that the UT will access a restricted access base station (RA BS) or decrease a probability that the UT will access a general access base station (GA BS);
obtaining a network access request from a first UT via a wireless signal, the network access request including identification information of the first UT; and
allowing or denying the network access request based on the identification information of the first UT.

48. The method of claim 47, wherein allowing or denying the network access request comprises:
retrieving a PLMN identifier associated with the first UT based on the identification information of the first UT;
comparing the PLMN identifier to the PLMN identifier associated with the first UT; and
allowing the network access request based on the PLMN identifier matching the PLMN identifier associated with the first UT.

49. The method of claim 43, wherein the one or more user terminals ignore small area base stations having a location area identifier different than a location area identifier of one or more home base stations of the one or more user terminals.

50. The method of claim 43, wherein the one or more user terminals scan for small area base stations upon detecting a location area identifier matching a location area identifier of one or more home base stations of the one or more user terminals.

51. A base station for providing mobile access in a sector of a wireless network, comprising:
a selective access module that employs a transceiver of the base station to transmit a set of one or more weighting parameters configured to weigh search and/or access parameters of a user terminal (UT) to increase a probability that the UT will access a local area base station or decrease a probability that the UT will access a macro area base station;
a registration module that obtains a network access request from a first UT via a wireless signal, the network access request including identification information of the first UT, and that allows or denies the network access request based on the identification information of the first UT.

52. The base station of claim 51, wherein the local area base station comprises a restricted access base station, a Home Node B (HNB), or a Femto base station.

53. The base station of claim 51, wherein the identification information of the first UT comprises an international mobile subscriber identity (IMSI).

54. The base station of claim 51, wherein the transceiver that obtains the network access request comprises the transceiver being further configured to obtain the network access request based on a cell access history of the first UT.

55. The base station of claim 54, wherein the transceiver that obtains the network access request based on the cell access history of the first UT comprises the transceiver being further configured to obtain the network access request based on the first UT determining that the base station is a preferred base station based on the cell access history of the first UT.

56. The base station of claim 54, wherein the base station receives the cell access history of the first UT from the first UT.

57. The base station of claim 54, wherein the cell access history of the first UT is recorded by the first UT.

58. The base station of claim 51, wherein the transceiver that obtains the network access request comprises the transceiver being further configured to obtain the network access request based on a mobility of the first UT.

59. The base station of claim 58, wherein the transceiver that obtains the network access request based on the mobility of the first UT comprises the transceiver being further configured to obtain the network access request based on the first UT ignoring small area base stations having a base station identifier different than the base station identifier of the base station.

60. The base station of claim 59, wherein the base station identifier of the base station comprises a Femto public land mobile network (PLMN) identifier.

61. The base station of claim 51, wherein the identification information of the first UT comprises a PLMN identifier associated with the first UT.

62. The base station of claim 61, wherein the registration module that allows or denies the network access request based on the identification information of the first UT comprises the registration module being further configured to allow or deny the network access request based on the PLMN identifier matching a PLMN identifier of the base station.

63. A base station for assigning location area identifiers to small area base stations, comprising:
    a transceiver; and
    a selective access module that defines one or more network regions containing one or more small area base stations and that employs the transceiver to assign location area identifiers to the one or more small area base stations in the one or more network regions, wherein a location area identifier of a small area base station is different than a location area identifier of a macro area base station providing wireless service in a network region containing the small area base station, and wherein the location area identifier of the small area base station is transmitted by the small area base station to one or more user terminals in a coverage area of the small area base station.

64. The base station of claim 63, wherein the selective access module that assigns the location area identifiers comprises the selective access module being further configured to assign a different location area identifier to each of the one or more small area base stations in a network region.

65. The base station of claim 63, wherein the selective access module that assigns the location area identifiers comprises the selective access module being further configured to assign a same location area identifier to each of the one or more small area base stations in a network region.

66. The base station of claim 63, wherein the location area identifier comprises a public land mobile network (PLMN) identifier.

67. The base station of claim 66, wherein the selective access module employs the transceiver to transmit a set of one or more weighting parameters configured to weigh search and/or access parameters of a user terminal (UT) to increase a probability that the UT will access a restricted access base station (RA BS) or decrease a probability that the UT will access a general access base station (GA BS), the base station further comprising:
    a registration module that obtains a network access request from a first UT via a wireless signal, the network access request including identification information of the first UT, and allows or denies the network access request based on the identification information of the first UT.

68. The base station of claim 67, wherein the registration module that allows or denies the network access request comprises the registration module being further configured to:
    retrieve a PLMN identifier associated with the first UT based on the identification information of the first UT;
    compare the PLMN identifier to the PLMN identifier associated with the first UT; and
    allow the network access request based on the PLMN identifier matching the PLMN identifier associated with the first UT.

69. The base station of claim 63, wherein the one or more user terminals ignore small area base stations having a location area identifier different than a location area identifier of one or more home base stations of the one or more user terminals.

70. The base station of claim 63, wherein the one or more user terminals scan for small area base stations upon detecting a location area identifier matching a location area identifier of one or more home base stations of the one or more user terminals.

\* \* \* \* \*